US007342903B2

(12) United States Patent
O'Neill et al.

(10) Patent No.: US 7,342,903 B2
(45) Date of Patent: Mar. 11, 2008

(54) METHODS AND APPARATUS FOR THE UTILIZATION OF MULTIPLE UPLINKS IN REVERSE TUNNELING

(75) Inventors: Alan O'Neill, Henley Beach (AU); George Tsirtsis, London (GB); Matthew Impett, Morristown, NJ (US); Vincent Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 959 days.

(21) Appl. No.: 10/413,415

(22) Filed: Apr. 14, 2003

(65) Prior Publication Data
US 2003/0224758 A1    Dec. 4, 2003

Related U.S. Application Data

(60) Provisional application No. 60/377,450, filed on May 2, 2002, provisional application No. 60/372,655, filed on Apr. 15, 2002.

(51) Int. Cl.
H04J 3/24    (2006.01)
(52) U.S. Cl. ...................... 370/331; 455/442
(58) Field of Classification Search ............... 370/331; 455/442
See application file for complete search history.

(56) References Cited

U.S. PATENT DOCUMENTS

| | | | |
|---|---|---|---|
| 5,903,559 A | | 5/1999 | Acharya et al. |
| 6,292,839 B1 * | | 9/2001 | Naudus et al. .............. 709/238 |
| 6,434,134 B1 | | 8/2002 | LaPorta et al. |
| 6,445,922 B1 | | 9/2002 | Hiller et al. |
| 6,487,605 B1 * | | 11/2002 | Leung ........................ 709/245 |
| 6,496,505 B2 | | 12/2002 | La Porta et al. |
| 6,519,254 B1 | | 2/2003 | Chuah et al. |
| 6,816,912 B1 * | | 11/2004 | Borella et al. .............. 709/238 |
| 6,970,445 B2 * | | 11/2005 | O'Neill et al. .............. 370/338 |
| 6,999,435 B2 * | | 2/2006 | Perras ........................ 370/331 |
| 2002/0015396 A1 | | 2/2002 | Jung |
| 2002/0018456 A1 | | 2/2002 | Kakemizu et al. |
| 2002/0026527 A1 | | 2/2002 | Das et al. |
| 2002/0191593 A1 | | 12/2002 | O'Neill et al. |
| 2003/0125027 A1 * | | 7/2003 | Gwon et al. ................ 455/436 |

(Continued)

OTHER PUBLICATIONS

C. Perkins, Editor "IP Mobility Support", Network Working Group, pp. 1-79 (Oct. 1996).

(Continued)

Primary Examiner—Edan Orgad
Assistant Examiner—Jay P. Patel
(74) Attorney, Agent, or Firm—Straub & Pokotylo; Michael P. Straub; Ronald P. Straub

(57) ABSTRACT

Methods and apparatus for improving tunneling techniques and reducing packet loss in mobile communications systems are described. The methods and apparatus are well suited for use with Mobile IP and can facilitate handoff operations. A mobile node establishes multiple tunnels, representing downlinks, from the mobile node perspective. The different downlink tunnels are through different access nodes but terminate at the same home agent. The mobile node maintains, at most, a single uplink tunnel at any given time with the home agent. Tunnels representing uplinks and downlinks are managed independently. Thus, each of the uplink and downlink tunnels can have different lifetimes and can be created/removed independently allowing for flexibility in handoff operations.

55 Claims, 10 Drawing Sheets

U.S. PATENT DOCUMENTS

| | | | |
|---|---|---|---|
| 2003/0137961 A1 | 7/2003 | Tsirtsis et al. | |
| 2003/0176188 A1 | 9/2003 | O'Neill | |
| 2003/0182433 A1* | 9/2003 | Kulkarni et al. | 709/228 |
| 2004/0196808 A1* | 10/2004 | Chaskar et al. | 370/331 |

OTHER PUBLICATIONS

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM SIGMOBILE Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework.00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

PCT International Search Report, for International Application No. PCT/US03/11471, Aug. 11, 2003.

* cited by examiner

METHODS AND APPARATUS FOR THE UTILIZATION OF MULTIPLE UPLINKS IN REVERSE TUNNELING

RELATED APPLICATIONS

The present application claims the benefit of the filing date of U.S. Provisional Patent Application Ser. No. 60/377,450 filed May 2, 2002 titled "Methods and Apparatus For the Utilization of Multiple Uplinks in Reverse Tunneling Method of Mobile IP Based Mobility Management Systems" and of U.S. Provisional Patent Application Ser. No. 60/372,655 filed Apr. 15, 2002 titled "Communications Methods and Apparatus".

FIELD OF THE INVENTION

The present invention relates to communications systems and, more particularly, to methods and apparatus for enabling the use of multiple uplinks and a downlink corresponding to a mobile node at the same time.

BACKGROUND

Mobile communications is an area of growing importance. To facilitate mobile communications various protocols and standards have been developed. Mobile IP (MIP) is an example of one such protocol. Different versions of MIP are currently in use. To understand the invention, it is useful to understand some Mobile IP basics. Mobile IP (v4/v6), also indicated as MIPv4 and MIPv6, enables a mobile node (MN) to register its temporary location indicated by a care-of-address (CoA) to its Home Agent (HA). The HA then keeps a mapping (also called a binding) between the MN's permanent address, otherwise called Home Address (HoA), and the registered CoA so that packets for that MN can be redirected to its current location using IP encapsulation techniques (tunneling).

The CoA used by a MN can be an address that belongs to a Foreign Agent (FA) when MIPv4 is used or it can be a temporarily allocated address to the MN itself in which case is called a collocated care-of-address (CCoA). The latter model also applies to MIPv4 while it is the only mode of operation in MIPv6.

Note that for the purpose of this document the terms CCoA and CoA as well as Registration and Binding Update (BU) are interchangeable since they are the corresponding terms for MIPv4 and MIPv6. The concepts and solutions described here are applicable to both MIPv4 and MIPv6 unless otherwise mentioned.

Various communications protocols and standards support handoffs, allowing a mobile node to change its point of attachment to the network from one access node to another access node. Handoffs may take place between links of the same technology (e.g.: 802.11) in which case this is called an intra-technology handoff or between links of different technology (e.g.: 802 and Flash Orthogonal Frequency Division Multiplexing [OFDM], in which case this is called an inter-technology handoff.

Inter-technology handoffs and even some intra-technology hand-offs are normally 'Make Before Break' in nature, i.e.: the MN has two (or more) independent link layer connections to two access nodes, e.g., access routers (ARs) at the same time, at least for a portion of the handoff. The time period during which the MN has two link layer connections may in some cases be extended for a long time. Although an IP handoff can be performed quickly, it is not necessary that one of the two links will be dropped immediately. Furthermore, it is also possible to create the second link without moving IP forwarding (hand-off) to it for some time. In these cases the MN will be receiving traffic from its HA via the FA it has previously registered with. The FA may be, e.g., an access router to which it is coupled. Thus, in the case of a handoff, the FA may be changed from a first access router to a second access router with the MN being coupled to both access routers for some period of time, e.g., by a wireless link. The FA is normally located in a Foreign network domain while the HA may be an access router in a home domain used by the MN to attach to the network while present in the home domain.

More traditional intra-technology handoffs such as that performed in an 802.11 system tend to be 'Break Before Make', which means that connectivity to the network through a current access point/router is lost so that connectivity via a new access point/router can be gained. In these scenarios handoff speed has to be maximized and some additional measures such us temporary tunneling between access routers, for in-flight packets to the old access router, often needs to be taken to eliminate packet loss.

Reverse tunneling in RFC3024 [RevTun] G. Montenegro, Ed. "Reverse Tunneling for Mobile IP", revised Internet RFC 024, January 2001, introduces new packet loss concerns at the HA and also incurs similar packet routing issues as RFC3220 [MIPv4] C. E. Perkins, Ed., "IP Mobility Support for Ipv4", RFC3220, January 2002 between Foreign Agents, during a handoff. In accordance with RFC3024 packets reversed tunneled to a HA from a MN or FA require a valid source address that is known at that HA, a valid source address being defined as the destination address, or CoA, that has been registered in the HA for the forward tunnel between the HA and that MIP node (MN or FA). If a valid address is not used, then the HA drops the reverse-tunneled packet according to the reverse tunnel mechanism of RFC3024. As a result packets that are reverse tunneled from a new CCoA at a MN, or a new CoA at a new FA, that arrive at the HA before the registration of that new CoA has been completed, will be dropped by the HA. In addition, any in-flight packets from the old FA will be dropped at the HA, once a visitor list at the HA has been updated with the new CoA at the new FA, or new MN CCoA from the new FA. This is because in either case the packet source address no longer matches the current CoA binding. In addition, whilst smooth handoff for MIPv4 may be achieved by using the Previous FA extension or Binding Update to the old access router, a corresponding solution does not exist for reverse tunneling during handoffs.

Simultaneous forward bindings are used in some mobile communication systems. Typically, each MN has one valid registration with a given HA and thus, only one HoA to CoA mapping exists in the HA at any one time. In some cases the MN can maintain multiple HoA to CoA bindings using a process called simultaneous bindings [SIMBIND] defined as part of MIP. In this case the HA replicates all downstream traffic and sends it to all the CoAs indicated in its multiple bindings. This duplicates the resources consumed in the network as well as on potentially expensive access links (e.g.: wireless links), which in a number of scenarios may be unacceptable.

Apart from the multiple copies of the traffic burdening the network, multiple copies of the same packet can create problems to Transmission Control Protocol (TCP) streams. e.g.: Multiple copies of the same TCP Ack may fool the TCP stack to think that there is congestion in the network and thus reduce or stop transmissions.

If the MN or the network operator does not want to incur the cost of simultaneous bindings the MN can not use multiple links at the same time. This is for two reasons.

Firstly, when MIPv4 is used with FAs, an FA will not forward traffic for a MN that has not registered with it. This is because FAs typically implement access lists that drop all packets that come from unregistered MNs for security reasons. This means that if the MN is registered with FA1 but also has connectivity to FA2, it can only send and receive traffic via FA1.

Secondly, MIPv4/v6 has a feature called reverse tunneling. This ensures that all uplink traffic from the MN goes via the HA before its final destination. The traffic is essentially tunneled back to the HA either by the MN itself or by the FA the MN is connected to. Similarly as before, the HA will not accept reverse tunneled packets from a given CoA or CCoA unless the MN registers that CoA/CCoA with it.

To improve tunneling functionality, another mechanism called "split tunneling" or "per flow movement" [FLOW-MOVE] has recently been proposed in this area. According to this an MN can create multiple forward bindings (tunnels) and assign traffic filters on each of them so that only some type of traffic is forwarded over each particular tunnel. For example a dual technology 802.11 and FOFDM node can create two tunnels with its Home Agent so that all voice traffic goes over the tunnel terminating on the FOFDM interface while all the data traffic goes over the tunnel terminating on the 802.11 interface.

In view of the above discussion, it is apparent that there is a need for a new mechanism, that enables a MN to send upstream traffic over multiple links to multiple access nodes, whilst receiving downstream traffic over a single link from a single access node.

SUMMARY

Methods and apparatus for improving tunneling techniques and reducing packet loss which can result from the use of reverse tunneling, e.g., during handoff are described. The methods and apparatus of the present invention are well suited for use with Mobile IP and can facilitate handoff operations, e.g., make before break handoffs.

Generally speaking, access nodes such as, e.g., base stations, have more transmitter power and can transmit stronger signals than can a mobile node. Accordingly, in some cases, a mobile node can receive signals from a base station but cannot transmit signals in a reliable manner to the base station. This is not uncommon in the case of a handoff from one base station to another where a mobile node begins moving out of range of a first base station and into the proximity of a second base station. From a signaling perspective, it would be desirable if a mobile node could transmit data signals, e.g., data packets, such as voice packets, text packets, etc. to any one of multiple base stations serving as MIP foreign agents FAs for the mobile node and have them routed, e.g., tunneled to its home agent HA. Such data packets are in contrast to control signals used to initiate a handoff and/or signal a mobile node's presence to a base station. The ability to maintain multiple data uplinks to a home agent is particularly useful during a handoff from one base station to another where the uplink to any one of the base stations involved in the handoff may be somewhat unreliable. The ability to support multiple downlinks from a home agent is generally less important than the need to support multiple uplinks given that the mobile node can often receive packets from a base station even when it cannot transmit packets to the base station.

In accordance with various features of the present invention, a mobile node can establish multiple tunnels representing uplinks to a home agent while maintaining a single downlink tunnel extending from the particular home agent. Tunnels representing uplinks and downlinks may be managed independently. Thus, each of multiple uplink tunnels and the downlink tunnel can have different lifetimes and be created/removed independently from one another. This is in contrast to the case of conventional MIP bidirectional tunnels where the tunnel in each direction must be created and removed as a unit. Thus, in accordance with the present invention, the single downlink tunnel from the home agent can be moved from one access node to another access node independent of moving a corresponding uplink tunnel.

As a mobile node moves, and switches from access node to access node, it can create a new uplink tunnel to its home agent while still maintaining the uplink tunnel corresponding to the old access node. Thus the new uplink tunnel may be established via the new access node as part of a handoff. Should the uplink through the new access node prove unreliable, the mobile node can switch back to using the uplink tunnel between the old access node and the HA, assuming the uplink tunnel was maintained.

During a handoff operation a new access node may establish a temporary packet reverse forwarding tunnel to the old access node. The new access node can then forward packets directed to the mobile node's home agent via the temporarily packet reverse forwarding tunnel and the old uplink tunnel between the old access node and the home agent. Once a new uplink and downlink tunnel is successfully established between the new access node and the mobile node's home agent, the old uplink tunnel and temporary packet reverse forwarding tunnel may be eliminated. Thus, in some embodiments, the ability to quickly establish a reverse tunnel between access nodes can be used to minimize uplink packet losses while an uplink tunnel is established between the new access node and the mobile node's home agent.

As discussed above, in accordance with various embodiments of the present invention, for each mobile node, a mobility agent supports at most one outgoing (downlink) tunnel and any number of incoming (uplink) tunnels, where incoming and outgoing are described relative to the mobility agent. The mobility agent may be implemented as a MIP home agent (HA) which is responsible for forwarding packets to the mobile node corresponding to the incoming and outgoing tunnels when said mobile node is located in a foreign network domain. The incoming tunnels and at most one outgoing tunnel have one end of each tunnel terminating at the mobility agent and the other end terminating at an access node, e.g., an access router through which the mobile node connects to the communications network, or directly at the mobile node itself. The access nodes in foreign network domains operate as foreign agents (FAs).

A source of packet loss associated with reverse tunneling is the fact that in any router, including the HA, data traffic is handled by faster processing (fast path), than signaling (slow path). This means that if a MN hands-off to a new CoA, and then registers the new CoA to its HA and immediately starts reverse tunneling from this newCoA, there is a chance that some packets will be lost. This is because the newCoA binding will have to be processed in the slow (signaling) path before data packets from that CoA can be accepted and thus a small number of packets may be dropped while the HA processes the new binding.

To solve the problem according to one embodiment of this invention the MN (or its FA) tunnels back to the old FA for a short time after the newCoA Registration is sent to the HA as discussed above. Reverse Tunneling from the newCoA directly to the HA can be resumed after a positive response accepting the new binding, is received from the HA.

An additional source of packet loss is then that in-flight reverse tunneled packets from the old FA CoA or old MN CCoA to the HA will be dropped by the HA once the new CoA Registration has been installed in the HA.

According to one embodiment of this invention, the HA maintains the old CoA in the HA as a valid source address for reverse tunneled packets. The lifetime of the old CoA is predetermined in the HA in some embodiments while in other embodiments it is based on a lifetime specified in the initial registration message originally used to install the oldCoA. In other embodiments the lifetime of the old CoA is signaled in an additional registration message sent from the MN. This registration message may be the same message used to install the newCoA. Alternatively, an old CoA may be left in place and remain valid in the HA for uplink purposes until the MN undertakes an additional hand-off. In such an embodiment the HA will maintain two CoAs as valid for reverse tunneled packets after an initial handoff corresponding to the MN. Thus, the old CoA at the HA, which corresponds to a particular mobile node, will remain valid for a period of time after registration of a new CoA for the particular mobile node in the home agent. This allows in transit packets sent from the old CoA to be successfully delivered despite the registration of the new CoA.

Tunnels between an HA and a CoA corresponding to a mobile node can birectional, incoming only, outgoing only or canceled. A flag indicating the type of tunnel is stored in the HA's memory along with the tunnel end node address. In accordance with the invention, the flag associated with a tunnel can be modified to alter the tunnel. The modification of the tunnel type indicator flag can be in response to a registration message used to trigger modification of the tunnel information, said registration message including tunnel end node addresses corresponding to the ends of the tunnel which is to have its registration information modified. Alternatively the tunnel indicator flag corresponding to a particular tunnel can be modified by changes to a tunnel indicator flag associated with another tunnel corresponding to the same mobile node as said particular tunnel. The particular tunnel and said another tunnel will have at least one tunnel end node address in common.

In accordance with the invention, tunnels may be modified by changing the flag associated with a particular tunnel. Thus, it is possible to change tunnels from any one of said possible tunnel configurations to another one of said possible tunnel configurations by simply signaling a change in the tunnel type flag associated with an existing tunnel. In several cases an incoming or outgoing tunnel of a bidirectional tunnel is eliminated by a change in the tunnel type flag, e.g., so that no more than one outgoing tunnel from said HA to a particular MN is maintained at any given time. Changes in signaling tunnel type flags are also used to add incoming (uplink) tunnels in some cases, e.g, where an outgoing (downlink) tunnel already exists.

Additional features, embodiments and advantages of the methods and apparatus of the present invention are set forth below in the detailed description which follows.

DETAILED DESCRIPTION

Figure 1:
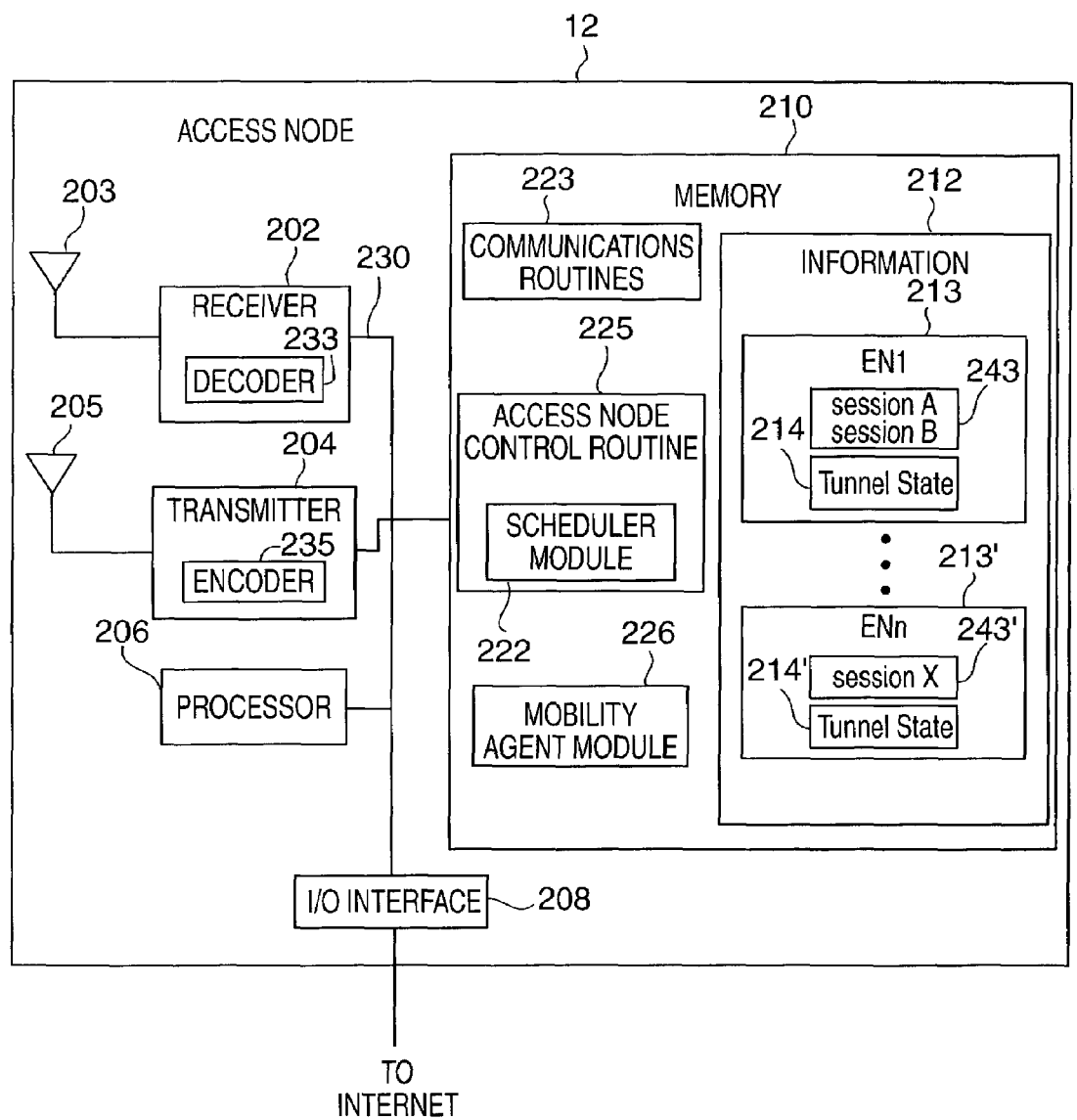
FIG. 1 illustrates an exemplary access node implemented in accordance with the present invention.

FIG. 1 illustrates an exemplary access node 12, e.g., access router or base station, implemented in accordance with the invention. The access node 12 includes antennas 203, 205 and corresponding receiver, transmitter circuitry 202, 204, respectively. The receiver circuitry 202 includes a decoder 233 while the transmitter circuitry 204 includes an encoder 235. The circuitry 202, 204 is coupled by a bus 230 to an I/O interface 208, a processor (e.g., CPU) 206 and memory 210. The I/O interface 208 couples the access node 12, e.g. base station or access router, to the Internet. The memory 210 includes routines, which when executed by the processor 206, cause the access node 12 to operate in accordance with the invention. Memory 210 includes communications routines 223 used for controlling the access node 12 to perform various communications operations and implement various communications protocols. The memory 210 also includes an access node control routine 225 used to control the access node's 12, e.g. base station's, operation and signaling to implement the steps of the method of the present invention. The access node control routine 225 includes a scheduler module 222 used to control transmission scheduling and/or communication resource allocation. Thus, module 222 may serve as a scheduler. The memory 210 also includes a mobility agent module 226 used to process and send mobility related signaling in accordance with various tunneling features of the present invention. Module 226 may serve as a Mobile IP Foreign Agent, Attendant or other local mobility agent. Memory 210 also includes information 212 used by communications routines 223, control routine 225 and mobility agent module 226. The information 212 includes an entry 213, 213' for each active end node (EN1, ENn), which includes a list of the active sessions 243, 243' being conducted by the end node (EN1, ENn) and includes tunneling state 214, 214' associated with said end node (EN1, ENn). In particular, information for end node 1 213 includes active session list 243, listing exemplary sessions A and B. Information for end node 1 213 also includes tunnel state 214, shown in detail in FIG. 3. Information about end node 'n' 213' as depicted in FIG. 1 includes session X 243' and also includes tunnel state 214', shown in detail in FIG. 3.

Figure 2:
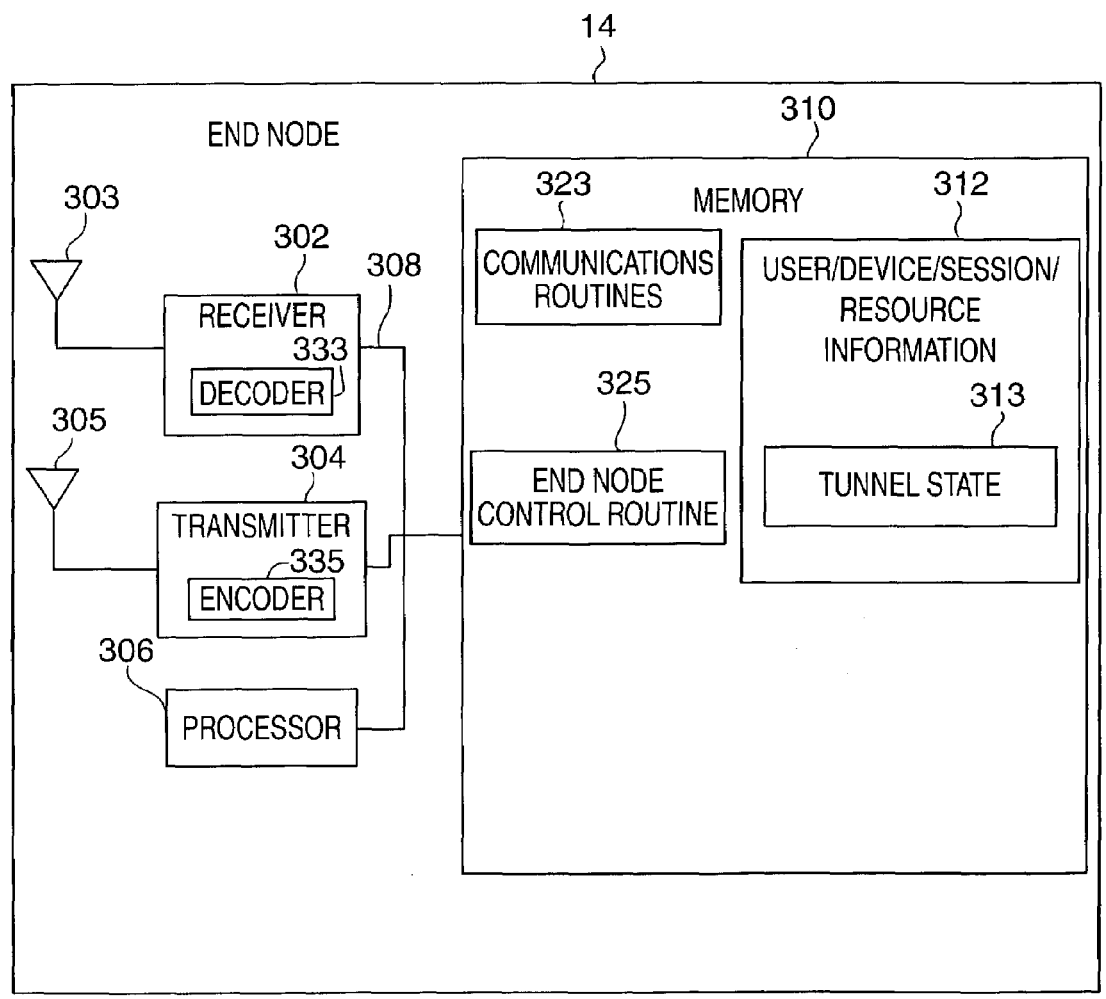
FIG. 2 illustrates an exemplary end node implemented in accordance with the present invention.

FIG. 2 illustrates an exemplary end node 14 implemented in accordance with the present invention. The end node 14 may be used by a user as a mobile terminal (MT). The end node 14 includes receiver and transmitter antennas 303, 305 which are coupled to receiver and transmitter circuitry 302, 304 respectively. The receiver circuitry 302 includes a decoder 333 while the transmitter circuitry 304 includes an encoder 335. The receiver transmitter circuits 302, 304 are coupled by a bus 308 to a memory 310 and processor 306. Processor 306, under control of one or more routines stored in memory 310, causes the end node 14 to operate in accordance with the methods of the present invention. In order to control operation of the end node 14, memory 310 includes communications routine 323 and end node control routine 325. The end node communications routine 323 is used for controlling the end node 14 to perform various communications operations and implement various communications protocols. The end node control routine 325 is responsible for insuring that the end node 14 operates in accordance with the methods of the present invention and performs the steps described in regard to end node operations and signaling. The memory 310 also includes user/device/session/resource information 312 which may be accessed and used to implement the methods of the present invention and/or data structures used to implement the invention. In particular, User/Device/Session/Resource information 312 includes tunnel state information 313 described in detail in FIG. 3.

Figure 3:
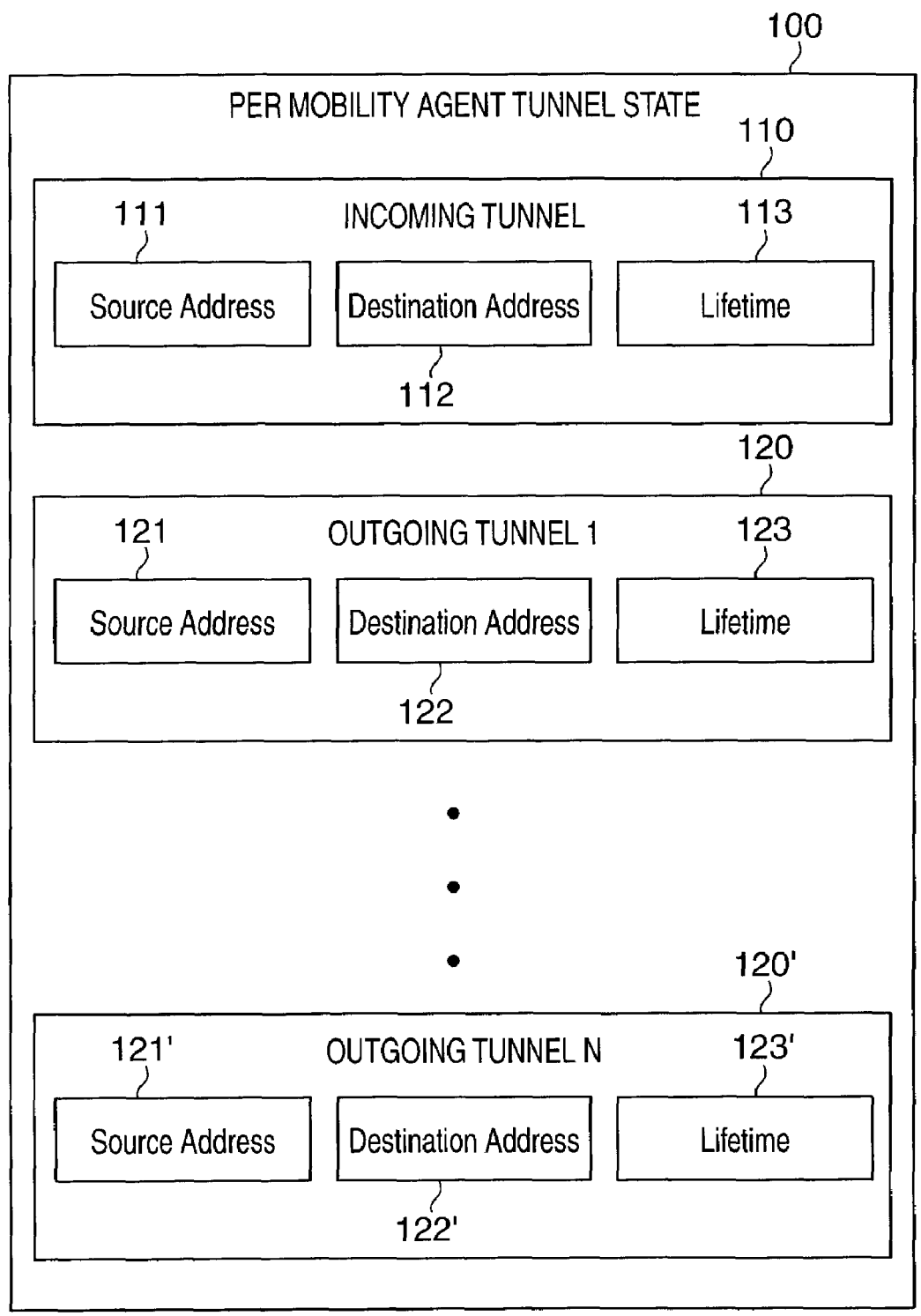
FIG. 3 illustrates the exemplary contents of tunnel state in FIGS. 1 and 2 implemented in accordance with the present invention.

FIG. 3 illustrates exemplary tunnel state 100, associated with a given mobility agent, implementing the tunnel state 214, 214' in access node 12 in FIG. 1 and tunnel state 313 in end node 14 in FIG. 2. The tunnel state term refers to the tunnel between the home mobility agent and the Care of Address of the Mobile Node. From the perspective of the access node 12 and the end node 14 of FIGS. 1 and 2 respectively, tunnel state 100 of FIG. 3 may include a number of tunnel state entries 110, 120, 120'. An incoming tunnel is defined as a tunnel towards the access node and the end node whilst an outgoing tunnel is from the access node and the end node towards for example a home agent.

The mobile node supports, for a given single mobility agent, e.g., Home Agent, at most, one incoming tunnel, e.g., downlink, at any given time, and any number of outgoing tunnels, e.g., uplinks. One end of said incoming and said outgoing tunnels terminating at said mobility agent. Thus, according to this invention each set of tunnel state 100 corresponding to a single mobile node includes state for at most one active incoming tunnel 110 including a source address 111, a destination address 112 and a lifetime 113 and any number of outgoing tunnels. Source address 111 of incoming tunnel with state 110 is the address used at the other end of said incoming tunnel with state 110, e.g.: a mobility agent address. Destination address 112 is, in the case of a foreign agent CoA, one of the addresses of access node 12 or end node 14 of FIGS. 1 and 2, respectively. Lifetime 113 is a timer associated with said incoming tunnel with state 110. When lifetime 113 expires, state regarding incoming tunnel 110 is removed.

According to this invention Tunnel state 100 also includes state for any number of outgoing tunnels 120, 120' (outgoing tunnel 1 state, outgoing tunnel N state, respectively). Outgoing tunnel state 120, 120' includes a source address 121, 121', a destination address 122, 122' and a lifetime 123, 123'. Each source addresses 121, 121' of outgoing tunnels, with state 120, 120', respectively, is a different address belonging to access node 12 or end node 14 of FIGS. 1 and 2, respectively.

Destination address 122, 122' is the address used at the other end of said outgoing tunnel with state 120, 120' e.g.: a mobility agent address. Lifetimes 123, 123' are timers associated with said outgoing tunnels with state 120, 120'. When lifetime 123, 123' expires state 120, 120' regarding the associated outgoing tunnel is removed.

Figure 4:
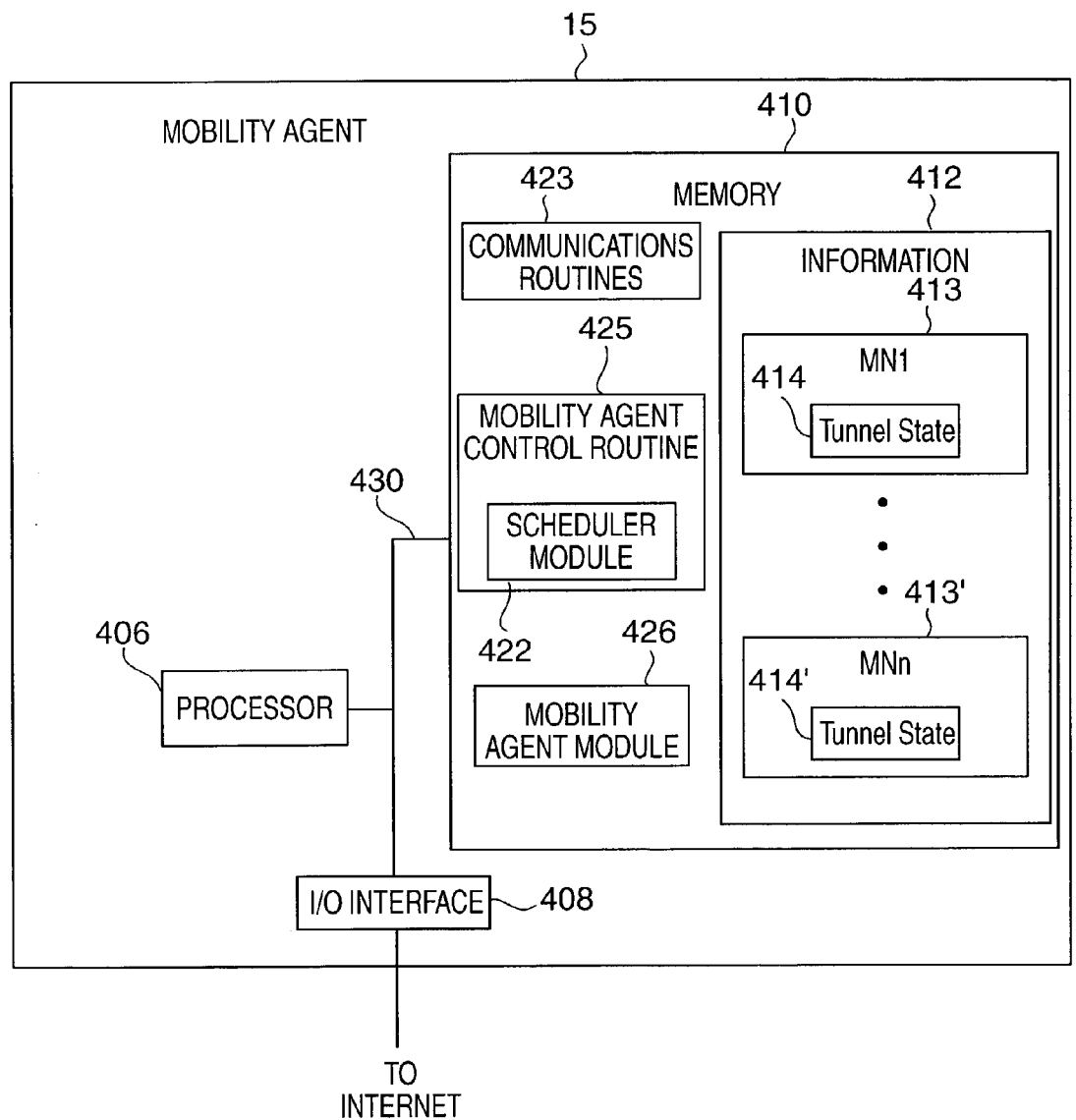
FIG. 4 illustrates an exemplary mobility agent node implemented in accordance with the present invention.

FIG. 4 illustrates an exemplary mobility agent node 15 implemented in accordance with the invention. The mobility agent node 15 may be used as a home mobility agent for an end node. The mobility agent node 15 includes a bus 430 that couples together an I/O interface 408, a processor (e.g., CPU) 406 and memory 410. The I/O interface 408 couples the mobility agent node 15 to the Internet. The memory 410 includes routines, which when executed by the processor 406, cause the mobility agent node 15 to operate in accordance with the invention. Memory includes communications routines 423 used for controlling the mobility agent node 15 to perform various communications operations and implement various communications protocols. The memory 410 also includes a mobility agent control routine 425 used to control the mobility agent node's 15 operation and signaling to implement the steps of the method of the present invention. The mobility agent node control routine 425 includes a scheduler module 422 used to control transmission scheduling and/or communication resource allocation. Thus, module 422 may serve as a scheduler. The memory 410 also includes a mobility agent module 426 used to process and send mobility related signaling implementing the steps of the method of the present invention. Thus, module 426 may serve as a Mobile IP Home Agent. Memory 410 also includes information 412 used by communications routines 423, control routine 425 and mobility agent module 426. The information 412 includes an entry 413, 413' for each active end node. In particular, information for end node 1 413 includes tunnel state 414, shown in detail in FIG. 5. Information about end node 'n' 413' includes tunnel state 414' also shown in detail in FIG. 5.

Figure 5:
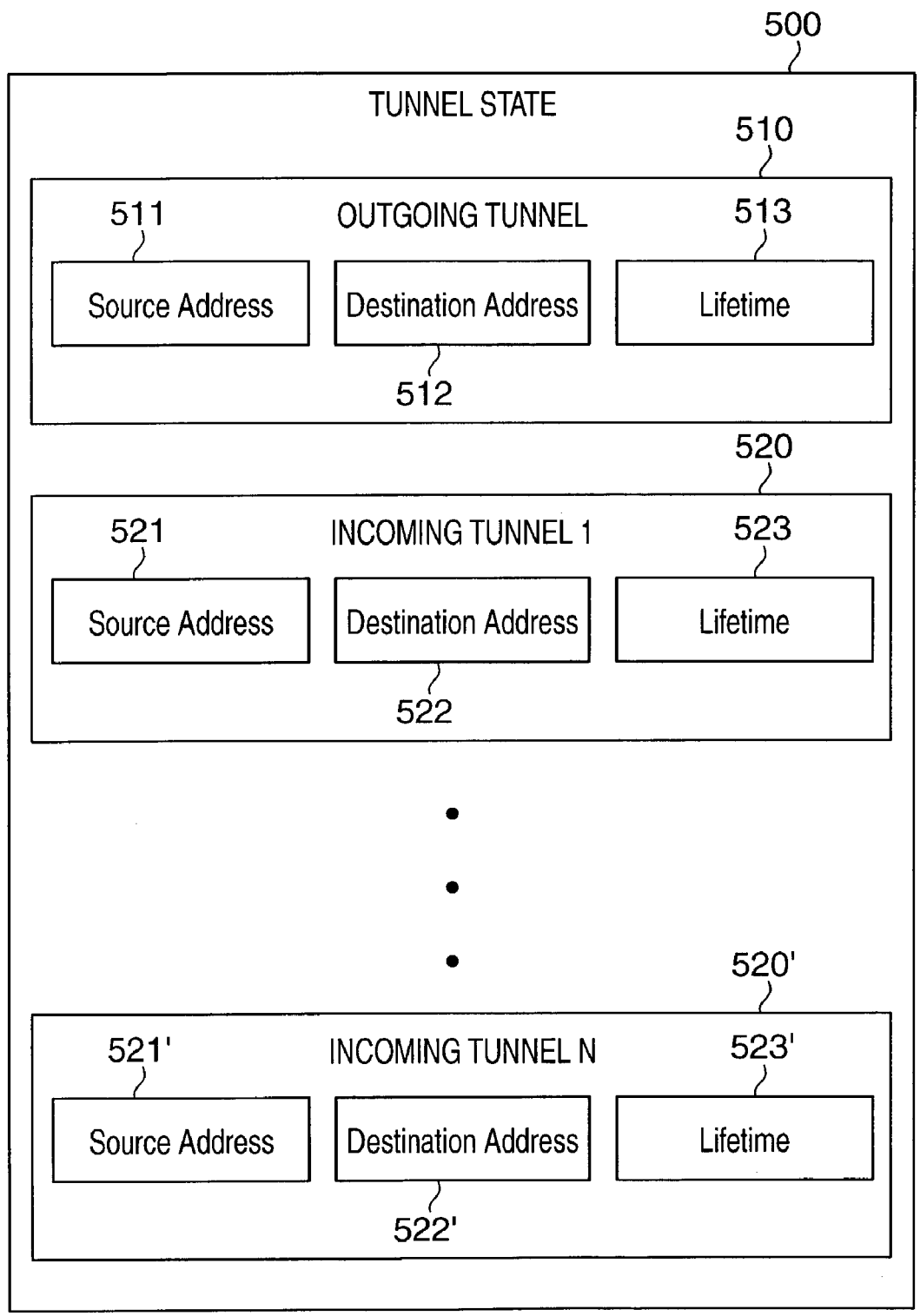
FIG. 5 illustrates the exemplary contents of tunnel state in FIG. 4 implemented in accordance with the present invention.

FIG. 5 illustrates example tunnel state 500, which is representative of, e.g., the same as or similar to, tunnel state 414, 414' shown in FIG. 4. From the perspective of the mobility agent node of FIG. 4, tunnel state 500 includes a number of tunnel state entries 510, 520, 520'.

According to this invention Tunnel state 500 includes state, for a specific home address of the Mobile Node, containing at most one outgoing tunnel 510 from the home agent including a source address 511, a destination address 512 and a lifetime 513. Source address 511 of outgoing tunnel 510 is an address belonging to the home mobility agent node 15 of FIG. 4. Destination address 512 is the address used at the other end of said outgoing tunnel with state 510 e.g.: an access node address in the case of a foreign agent CoA. Lifetime 513 is a timer associated with said outgoing tunnels 510. When lifetime 513 expires, state regarding at least outgoing tunnel 510 is removed.

According to this invention Tunnel state 500 includes state, for a specific home address, containing any number of incoming tunnels 520, 520' to the home agent (incoming tunnel 1 state, incoming tunnel N state, respectively). Incoming tunnels with state 520, 520' include a source address 521, 521', a destination address 522, 522' and a lifetime 523, 523'. Source addresses 521, 521' of incoming tunnels with state 520, 520' respectively are addresses used at the other end of said incoming tunnel with state 520, 520' e.g.: access node addresses. Each destination address 522, 522' of incoming tunnels with state 520, 520' respectively is one of the addresses of mobility agent node 15 of FIG. 4. Lifetimes 523, 523' are timers associated with incoming tunnels with state 520, 520' respectively. When lifetimes 523, 523' expire, state regarding incoming tunnel 520, 520' is removed.

Figure 6:
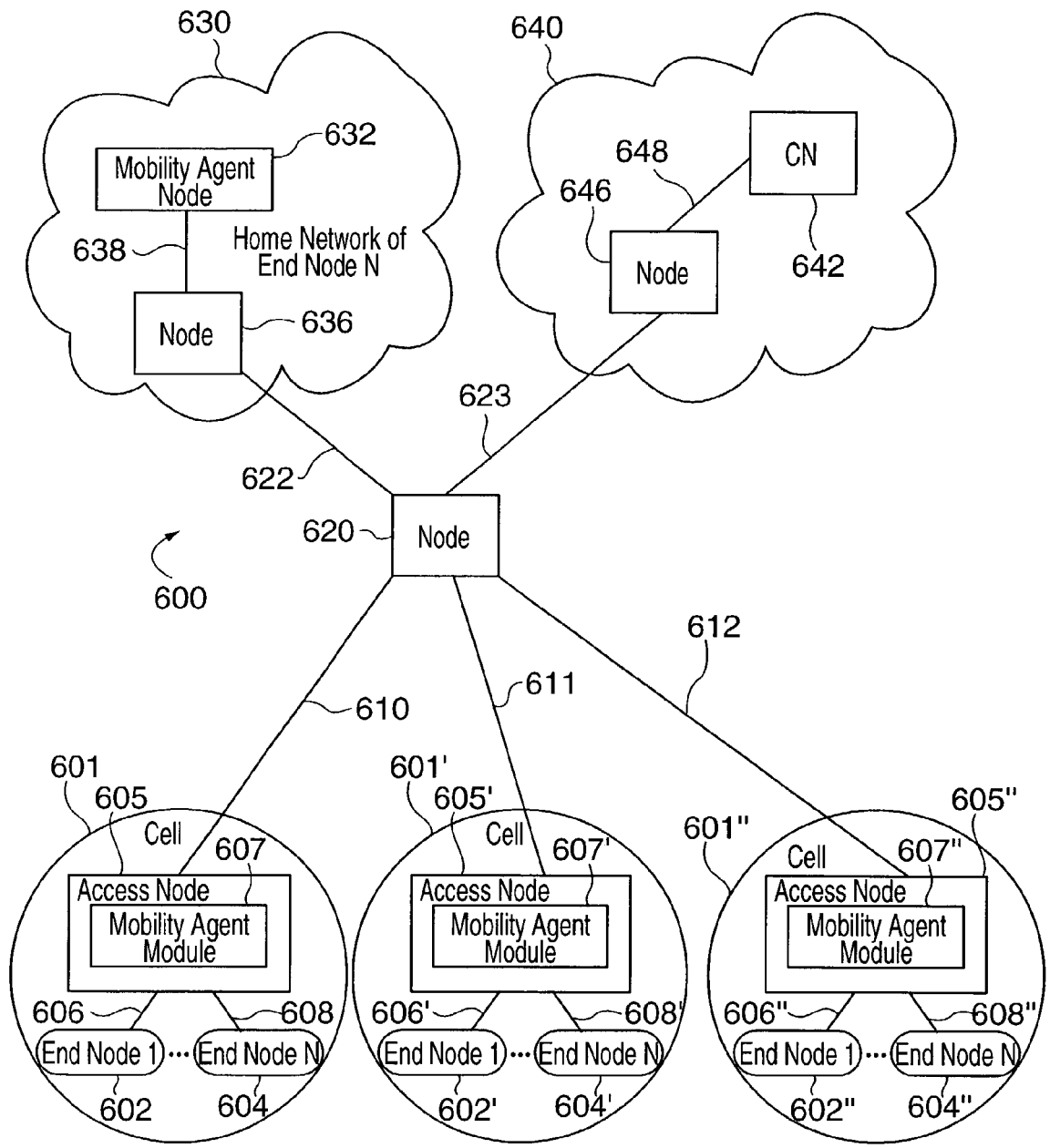
FIG. 6 illustrates a network diagram of an exemplary communications system in which the invention is applicable.

FIG. 6 illustrates an exemplary system 600 comprising a plurality of access nodes 605, 605', 605" implemented in accordance with the present invention. FIG. 6 also depicts communication cells 601, 601', 601" surrounding each access node 605, 605', 605", respectively, which represents the coverage area of corresponding access node 605, 605', 605", respectively. The same physical and functional elements are depicted in each of the communication cells 601, 601', 601", thus the following description of the elements in the cell 601 surrounding access node 605 is directly applicable to each of the cells 601, 601', 601". The depiction of the access node 605 is a simplified representation of the access node 12 depicted in FIG. 1. For simplicity access node 605 is shown to include a mobility agent module 607 responsible for the signaling implementing this present invention. FIG. 6 illustrates the access node 605 providing connectivity to a plurality of N end nodes 602, 604 (End node 1, End node N) via corresponding access links 606, 608, respectively. End nodes 602, 604 are simplified versions of the end node 14 depicted in FIG. 2.

Interconnectivity between the access nodes 605, 605', 605" is provided through network links 610, 611, 612 and an intermediate network node 620. Home network 630 of End Node N 604 in FIG. 6 is connected to the rest of the system via link 622 and node 620. Home Network 630 further includes network node 636 also connected to link 622 and mobility agent node 632, connected to node 636 via link 638 and operating as mobility agent of at least end node N 604. Network 640 in FIG. 6 is connected to the rest of the system via link 623 and node 620. Network 640 further includes network node 646 also connected to link 623 and a correspondent node (CN) 642, connected to node 646 via link 648 and operating as corresponding node in a data session with at least end node N 604 for illustration of the methods of this present invention.

Figure 7:
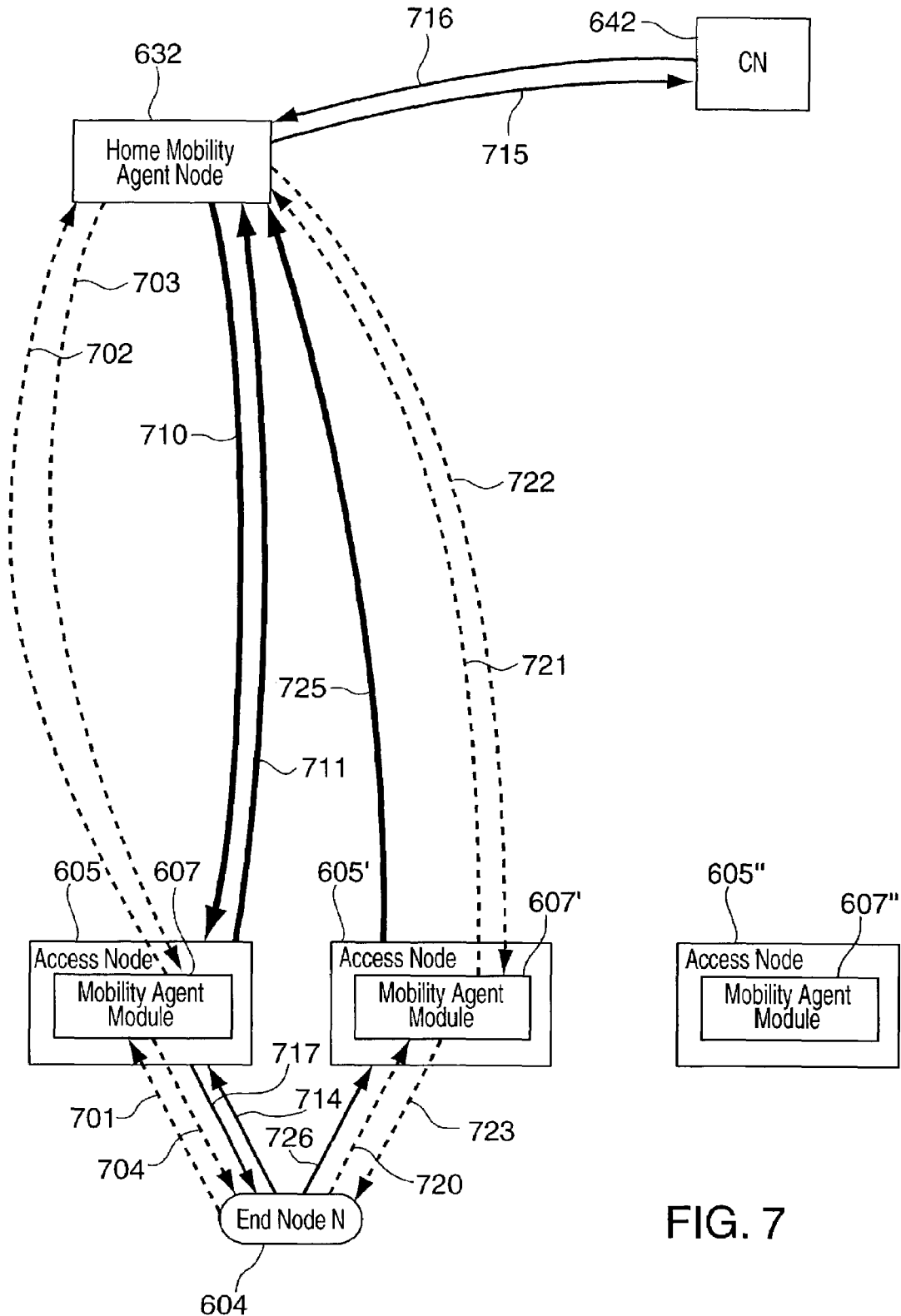
FIG. 7 illustrates signaling and operations associated with the establishment of forward and reverse tunnels in accordance with this invention.
Figure 8:
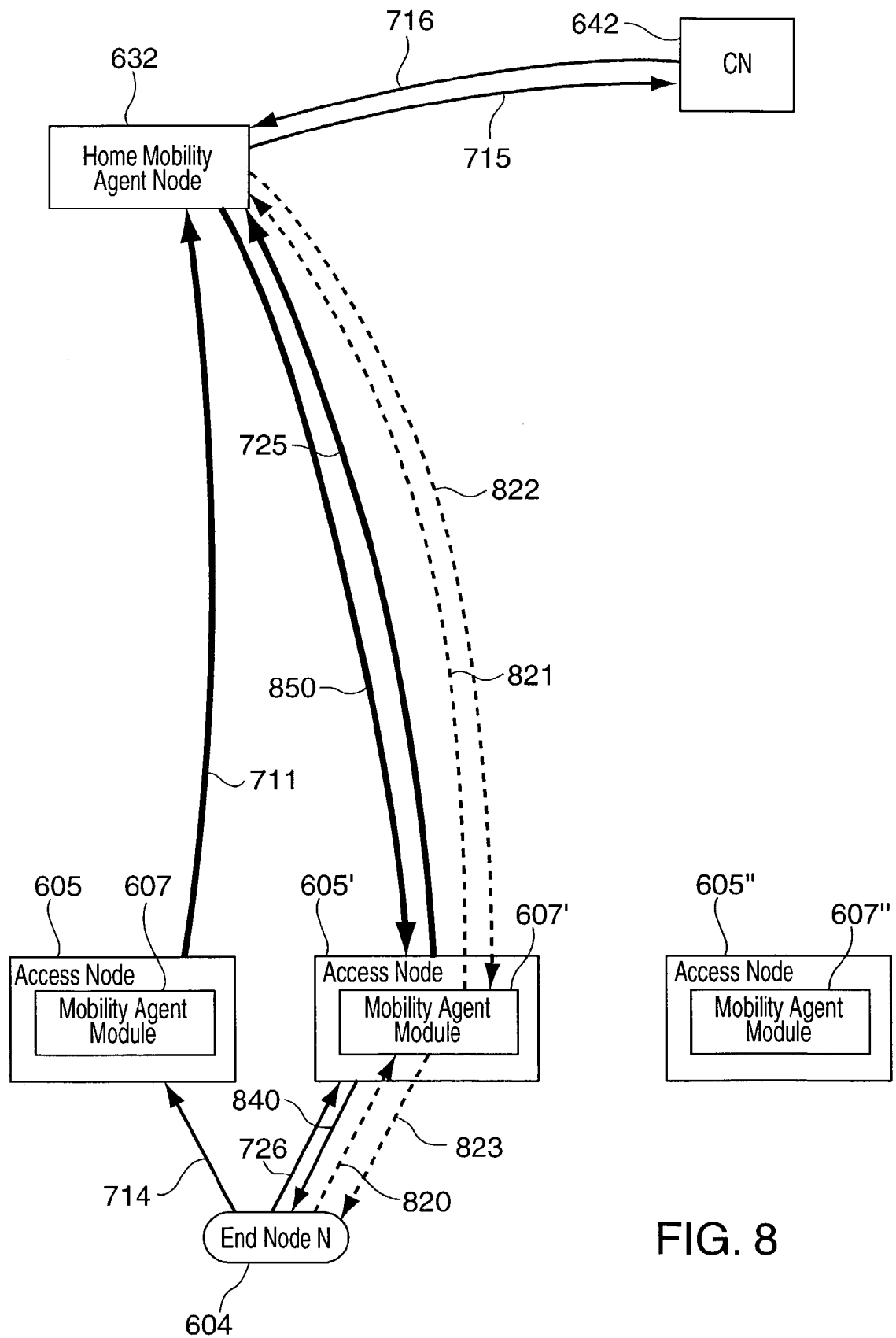
FIG. 8 illustrates signaling and operations associated with the movement of forward tunnels in accordance with this invention.
Figure 9:
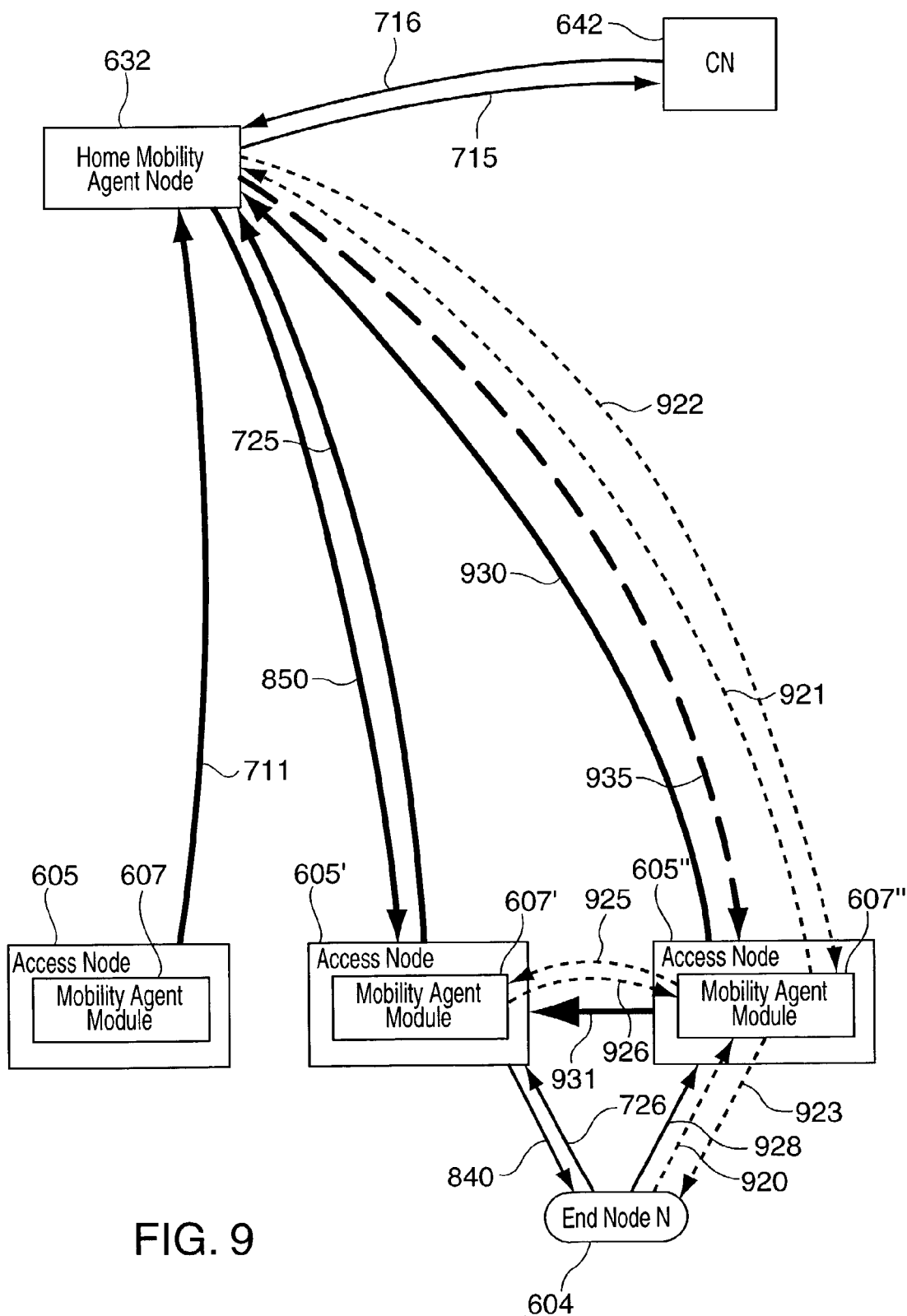
FIG. 9 illustrates signaling and operations associated with the establishment of reverse tunnels between access nodes in accordance with this invention.

FIGS. 7-9 illustrate exemplary embodiments of various methods of this present invention. FIGS. 7-9 are simplified versions of the system of FIG. 6 ignoring elements that are not required to further explain the invention with regard to the embodiments of FIGS. 7-9. FIGS. 7-9 show access nodes 605, 605', 605", including mobility agent modules 607, 607', 607", providing access to end node 604. FIGS. 7-9 also show mobility agent node 632 serving end node 604 and a CN node 642 being in a communication session with said end node 604. In FIGS. 7-9 solid thin arrows depict data traffic and the direction of the arrow points to the destination of said data traffic; thick solid lines depict tunnels and the direction of the arrow points to the destination of said tunnel; dashed lines depict signaling messages used for the registration of an end node to the mobility agent and the direction of the arrow points to the destination of said signaling.

In FIG. 7 end node 604 sends registration request signal 701, including the address of the end node 604, the address of the mobility agent node 632, the address of the access node 605 and an indication that forward and reverse tunneling is required, to access node 605. Access node 605 processes signal 701 via mobility agent module 607 and forwards registration request signal 702, also including at least a portion of the information included in signal 701, to mobility agent node 632.

Mobility agent node 632 receives signal 702 and sets up tunnel state associated with said end node 604 in its tunnel state 414' of FIG. 4. Said state 414' includes outgoing tunnel 710 (forwarding direction) and incoming tunnel 711 (incoming direction) state (e.g. 510 and 520 of FIG. 5) according to the contents of message 702. In particular the source address (e.g.: 511 in FIG. 5) of the outgoing tunnel 710 is set to the address of the mobility agent 632 and the destination address (e.g.: 512 in FIG. 5) of the outgoing tunnel 710 is set to the address of access node 605 while a lifetime (e.g.: 513 in FIG. 5) is associated with said state (e.g. 510 in FIG. 5). The source address (e.g.: 521 in FIG. 5) of the incoming tunnel 711 is set to the address of the access node 605 and the destination address (e.g.: 522 in FIG. 5) of the incoming tunnel 711 is set to the address of mobility agent node 632 while a lifetime (e.g.: 523 in FIG. 5) is associated with said state (e.g. 520 in FIG. 5). In one embodiment of this invention said lifetimes above are included in signals 701, 702.

Any packets arriving at the mobility agent node 632 and having the address of end node 604 as the destination address e.g.; data packets 716 from CN 642 are now forwarded to the outgoing tunnel 710, e.g.: they are encapsulated according to tunnel state 710 (e.g.: 510 in FIG. 5) and sent to access node 605 for decapsulation and then packets 717 are sent to EN 604. Mobility agent node 632 is also now accepting packets with source address equal to the address of the end node 604, that arrive on incoming tunnel 711 (e.g.: incoming tunnel 1 with state 520 in FIG. 5) and then forwarding packets towards the destination address e.g.: data packets 715 towards CN 642.

Mobility agent node 632 then sends registration reply signal 703 to access node 605. Access node 605 receives signal 703 and stores equivalent state for tunnels 710 and 711 with the state stored in the mobility agent node 632 into the access node 605 so that any packets with source address equal to that of end node 604 are forwarded in tunnel 711 e.g.: packets 714, and any packet coming from the tunnel 710 that have the destination address equal to that of end node 604 are forwarded to that end node. Access node 605 then forwards registration reply signal 704 to end node 604.

In particular, said state of access node 605 (e.g.: 110 of FIG. 3) includes incoming tunnel 710 and outgoing tunnel 711 according to the contents of message 703. In particular the source address (e.g.: 111 in FIG. 3) of the incoming tunnel 710 is set to the address of the mobility agent 632 and the destination address (e.g.: 112 in FIG. 3) of the incoming tunnel 710 is set to the address of access node 605 while a lifetime (e.g.: 113 in FIG. 3) is associated with said state (e.g. 110 of FIG. 3). The source address (e.g.: 121 in FIG. 3) of the outgoing tunnel 711 is set to the address of the access node 605 and the destination address (e.g.: 122 in FIG. 3) of the outgoing tunnel 711 is set to the address of mobility agent node 632 while a lifetime (e.g.: 123 in FIG. 3) is associated with said state (e.g.: 120 of FIG. 3).

End node 604 according to this invention sends a registration request signal 720, including the address of the end node 604, the address of the mobility agent node 632, the address of the access node 605' and a new and novel extension indicating that reverse only tunneling is required, to access node 605'. As with signal 701, access node 605' processes signal 720 and forwards signal 721 to mobility agent 632. On reception of signal 721 and according to this invention, mobility agent 632 stores an incoming only tunnel 725 from access node 605' The state for tunnel 725 will include the address of access node 605' as source address (e.g.: 521' in FIG. 5), the address of the mobility agent 632 as destination address (e.g.: 522' in FIG. 5) and an associated lifetime (e.g.: 523' in FIG. 5). The new tunnel state (e.g.: 520' in FIG. 5) does not affect the state of tunnels 710, 711 (e.g.: 510, 520 in FIG. 5).

Mobility agent node 632 sends registration reply signal 722 similar to signal 703 to access node 605'. On reception of signal 722, access node 605' stores the equivalent state to the state stored in the mobility agent node 632 regarding tunnel 725 in the access node 605' and forwards signal 723 to end node 604.

At this stage and according to this invention the end node 604 can send packets to either of access nodes 605, 605' e.g.: packets 714, 726 with destination address equal to the address of CN node 642. Said packets 714, 726 will be encapsulated in tunnels 711, 725 respectively by respective access nodes 605, 605' and forwarded to mobility agent node 632. Mobility agent node 632 decapsulates said packets arrived on said tunnels 711, 725 and forwards them to CN node 642 as shown in FIG. 7 by arrow 715. The mobility agent 632 can accept packets from the end node 604 via two different tunnels from two different access node CoAs because both CoAs have been explicitly registered into that mobility agent 632.

For purposes of brevity, FIG. 8 shall only be discussed in regards to the changes with respect to FIG. 7. In FIG. 8 end node 604 changes the tunnel 710 (in FIG. 7) to tunnel 850 (in FIG. 8) terminating on access node 605' instead of access node 605, without affecting reverse tunnels 711, 725. End node 604 according to this invention sends a registration request signal 820, including the address of the end node 604, the address of the mobility agent node 632, the address of the access node 605' and an new and novel extension indicating that forward only tunneling is required, to access node 605'. As before, access node 605' processes and forwards signal 821, similar to signal 721 of FIG. 7, to mobility agent node 632. On reception of signal 821 and according to this invention, mobility agent node 632 stores state for an outgoing tunnel 850 to access node 605' without affecting the state of tunnels 711, 725. The state for tunnel 850 includes the address of the mobility agent node 632 as source address, the address of access node 605' as destination address and an associated lifetime. The state for tunnel 850 replaces the existing state for tunnel 710 i.e.: tunnel 850 state overwrites tunnel state 510 of FIG. 5.

Mobility agent node 632 sends registration reply signal 822 similar to signal 703 of FIG. 7 and on reception, the access node 605' stores the equivalent state for tunnel 850, to the state stored in the mobility agent node 632, into access node 605', and forwards signal 823 to end node 604. Packets arriving at the mobility agent 632 and having the address of end node 604 as the destination address, e.g., data packets 716 from CN 642 are now forwarded to the outgoing tunnel 850, e.g., they are encapsulated according to tunnel 850 state and send to access node 605. Access node processes, e.g., decapsulates the received packets, and transmits packets 840 resulting from the processing to EN 604.

In an alternative embodiment the signal 820 requests bidirectional tunneling which adds the outgoing tunnel capability to the existing incoming tunnel capability, which avoids the need to send the outgoing only extension in signal 820.

For purposes of brevity, FIG. 9 shall be discussed in regards to how it differs in respect to FIGS. 7 and 8. In FIG. 9 end node 604 moves toward access node 605". While maintaining connectivity to access node 605', end node 604 according to this invention sends a registration request signal 920, including the address of the end node 604, the address of the mobility agent node 632, the address of the access node 605", the address of the access node 605' and a new and novel extension indicating that reverse only tunnels are required, to access node 605". As with signal 701 in FIG. 7, access node 605" processes signal 920 and forwards signal 921 to mobility agent node 632. In addition access node 605" sends signal 925 to access node 605' containing the address of the end node 604, the address of the access node 605", the address of the access node 605' and a new and novel extension indicating that reverse only tunnel is used.

On reception of signal 925 and according to this invention, access node 605' stores state for an incoming only tunnel 931 from access node 605". The state for tunnel 931 will include the address of access node 605" as source address, the address of access node 605' as destination address and an associated lifetime. Access node 605' then sends a reply signal 926 to access node 605". On reception of signal 926, access node 605" stores the equivalent state for tunnel 931 with the state stored in the access node 605'.

On reception of signal 921 and according to this invention, mobility agent node 632 stores state for an incoming only tunnel 930 from access node 605" without affecting the state of tunnels 711, 725 and 850. The state for tunnel 930 will include the address of access node 605" as source address, the address of the mobility agent node 632 as destination address and an associated lifetime. Mobility agent node 632 as before sends registration reply signal 922 to access node 605". On reception of signal 922, access node 605" stores the equivalent state for tunnel 930, to the state stored in the mobility agent node 632, into the access node 605" and forwards signal 923 to end node 604.

Generally, it will be possible to setup tunnel 931 in less time than tunnel 930 due to the shorter signaling distances involved compared to the signaling distances associated with establishing tunnel 930. In some embodiments, tunnel 931 is used as a temporary tunnel to forward packets to the home mobility agent 632 via tunnel 725 while tunnel 930 is being established. In other embodiments tunnels 930 and 931 are maintained at the same time with access node 605" determining which tunnel 930 or 931 to use to transmit data received from the end node 604 in packets 928.

In an alternative embodiment of the invention, signals 920, 921, 922, 923 are used to request both forward and reverse tunneling between access node 605" and mobility agent 632. In that case tunnel 935, shown with a thick dashed line, is also created between the two nodes (605", 632) and since this is an outgoing tunnel from the perspective of the Home Mobility Agent Node 632, tunnel 935 replaces tunnel 850. In another alternative embodiment of the invention, the same or similar signaling 920, 921, 922, 923 includes extensions that modify the state of the reverse tunnels 711, 725 e.g.: to remove state about tunnel 711. In another alternative embodiment of the invention, messages 925 and 926 create a bidirectional tunnel when the downlink is also being moved to the access node 605".

Figure 10:
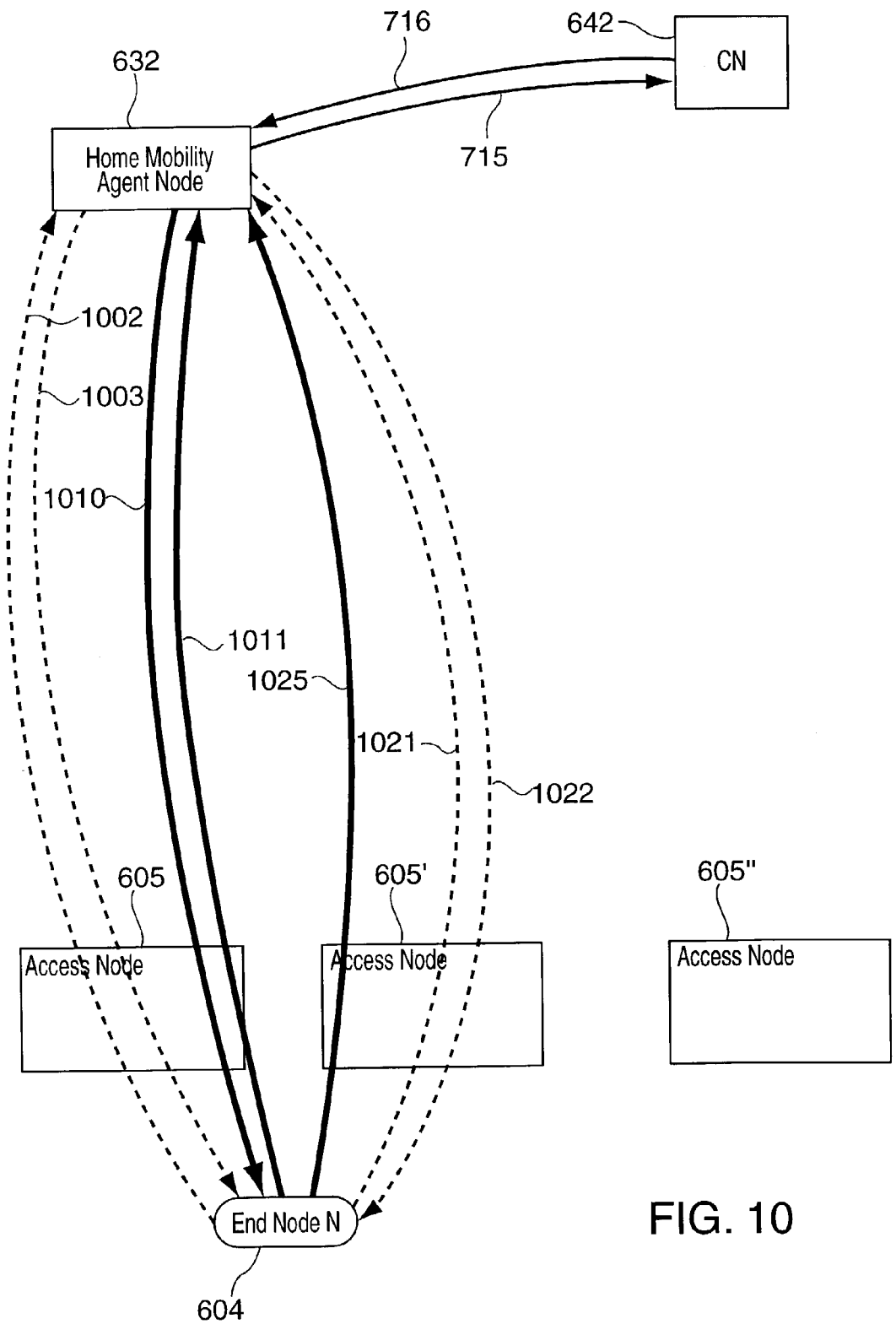
FIG. 10 illustrates signaling and operations associated with the establishment of forward and reverse tunnels in accordance with this invention without the intervention of access nodes.

Only new features described in FIG. 10 with respect to FIGS. 7-9 shall be described below. FIG. 10 shows an example of an alternative embodiment of the invention in which the access nodes 605, 605', 605" are not involved in either the signaling or the tunneling described in this invention. In this case said access nodes 605, 605', 605" work as pass through nodes and do not process signaling or encapsulate/decapsulate packets. In FIG. 7, signals 702, 703 are generated by the access node 605 and are sent to the mobility agent node 632 to establish tunnels 710, 711; instead, in FIG. 10, signals 1002, 1003 are generated by end node 604 and sent directly to mobility agent 632. Said signals 1002, 1003 establish tunnels 1010, 1011. Similarly, signals 1021, 1022 establish tunnel 1025. The state associated with said tunnels 1010, 1011, 1025 in the mobility agent 632 is nearly identical to that described in FIG. 7 while the state associated with said tunnels 1010, 1011, 1025 in the end node 604 is the combination of state that was described in FIG. 7 with regard to state stores in access nodes 605, 605'.

Numerous variations on the above described methods and apparatus involving the use of MIPv6 and/or MIPv6 are possible as will now be discussed.

In an exemplary Mobile IPv4 (MIPv4) based implementation of this invention the following steps are taken. When an FA is used in MIPv4, Routing Optimization defines how the forward smooth handoff can be implemented. A Previous Foreign Agent Extension (PFANE) is attached to a Registration Request (RREQ) and sent from the MN to the FA. The FA combines information included in the PFANE and the RREQ to construct a Binding Update (BUv4) that is then sent to the oldFA as indicated in the PFANE. On reception of the BUv4 the oldFA changes its binding to the newCoA of the MN and creates a tunnel towards the newFA.

In addition to the existing mechanism described above in this present invention we define that if the MN was using reverse tunneling at the oldFA, and if the MN requested reverse tunneling at the newFA (i.e.: The T flag was set in RREQ header) a reverse tunnel is also established from the newFA to the oldFA.

Existing MIPv4 Binding Updates (BUv4) by definition create bi-directional bindings i.e.: the receiver of a BUv4 is expected to encapsulate packets towards the CoA indicated by the binding and de-capsulate packets from the same CoA.

In accordance with one feature of the invention, in some embodiments, a new Binding Update flag is used to explicitly notify the old FA that reverse tunneling is requested. The BU to the old FA then has a new Reverse Tunnel bit set when reverse tunneling is requested. The BUack and associated error processing is extended so that the BU can be accepted even if the requested reverse tunneling is not supported.

The policy change introduced by this invention is as follows:

RREQ/PFANE handling at newFA

On reception of a valid RREQ with a PFANE extension the newFA sends a BUv4 to the oldFA and a RREQ to the HA. If the 'T' bit is set in the RREQ, then the newFA sets a reverse tunnel towards the oldFA for that MN. This tunnel is now used for all reverse tunneled traffic from the MN until a predetermined time or event. That can be either a fixed timer or the reception of the Registration Reply (RREP) from the HA.

BUv4 handling at oldFA

When a valid BUv4 is received about a given mobile node the oldFA should by definition be prepared to accept and de-capsulate packets from the newCoA indicated in the BUv4. If the mobile node in question had previously registered with the 'T' bit set and thus a reverse tunnel to its HA is available, any traffic reverse tunneled from the newCoA should be further reverse tunneled to the HA. If the additional reverse tunneling flag was also used in the BUv4 then the old FA is also able to reject the reverse tunneling and still accept the forward tunneling in the event that no reverse tunnel exists between the old FA and the MN's HA.

Various new Packet Forwarding Rules are implemented in accordance with various features of the invention.

In an alternative embodiment of this invention to avoid the MN from sending reverse tunneled packets towards an MIP node that lacks a suitable binding for those packets, the MN or FA can, and does, buffer packets for a short configured time after the MIP Reg/BU requesting implicit or explicit reverse bindings is sent. If the Registration is successful, and if MIP Replies or BUacks from the HA and/or the oldFA (when forwarding via the oldFA reverse binding) are then received at the newFA/MN before this safety timer, than packets can be safely forwarded into the reverse tunnel. The FA then stops forwarding towards the oldFA (oFA) when the MIP Reply is received and does not forward towards the oFA if the BUack is received after the MIP Reply. To avoid reordering of packets, the newFA (nFA) should not start sending directly towards the HA until after a suitable time following sending towards the oFA. Similarly the oFA should not forward packets reverse tunneled from the nFA, towards the HA, until all packets received directly at the oFA over the old link have been sent. When multiple uplinks are in place with valid HA reverse bindings, then the MN can make suitable choices as to which packets to send over which link towards the HA, and which packets, if any, need to go to the oldFA on their way to the HA. Specifically, control packets should be sent through the correct FAs to refresh and build protocol state for MIP and other protocols such as Internet Group Management Protocol (IGMP), AAA, SIP, and QoS state.

Various features of the present invention may be used with MIPv6. In MIPv6 there are no FAs. The mobile nodes are themselves responsible for their own encapsulation/decapsulation. MIPv6 BUs (BUv6) as their MIPv4 counterparts (BUv4) by definition create bidirectional bindings.

To have the same effect of reverse smooth handoff as that described for MIPv4 a slightly different approach is taken in accordance with the present invention in the case of MIPv6. This is because the forward smooth mechanism, enabled by a BUv6 to the oldAR can not be used for reverse smooth handoff since the oldAR in MIPv6 is not responsible for reverse tunneling to the HA of the mobile node.

Instead the mobile node may, and in various implementations does, use the alternate-CoA address extension as defined in MIPv6 specification. Normally reverse tunneled packets are sent using the correct CoA as a source address. The 'correct' CoA is the one that the receiver of the packet already has a valid binding for. According to the current MIPv6 specification a mobile node can send reverse tunneled packets to other nodes (including its HA) while using a different address than its valid CoA as source address for the packet, but it can only do that if it also includes the correct CoA in the alternate-CoA extension.

Using this mechanism we can recreate the policy of this invention we implemented in the FA for the MIPv4 case that was discussed above:

According to one MIPv6 embodiment of this invention when a mobile node moves to a newAR it first acquires a newCoA for its new position. Following that, it sends a BUv6 to its HA to register the new binding. Assuming the mobile node wants to use reverse tunneling, any outgoing packets should now be reverse tunneled using the newCoA as source address and the oldCoA in the alternate-CoA extension, until a predetermined time or event. That can be either a fixed timer or the reception of the Binding Acknowledgement (BAck) from the HA at which point the mobile node should now revert to simply using the new CCoA as a source address, and can omit the old CCoA.

In accordance with various features of the invention, implicit simultaneous reverse bindings are supported. In one such embodiment, the HA maintains multiple (at least two) simultaneous bindings for each MN using reverse tunneling with only one of those bindings being enabled for downlink traffic.

Current MIP specifications require that a binding to a newCoA replaces the old binding and thus only one binding is maintained at any one time. This then forces the use of the smooth reverse hand-off mechanisms previously described to avoid packet loss at the HA.

In one exemplary embodiment of this invention we define that the binding to a newCoA does replace the old binding as far as downlink traffic is concerned so that the tunnel from the HA to the MN is immediately switched to the newCoA. The binding to the newCoA is, however, added to the old binding as far as reverse tunneling is concerned. This way any in-flight packets that reach the HA over a reverse tunnel from the oldCoA are still processed normally instead of being dropped, as currently happens according to existing specifications.

The HA can then follow different policies according to requirements. In one exemplary embodiment of the invention the HA defines a fixed timeout for old reverse bindings, after which the old binding is removed. In an alternative embodiment it could maintain the old reverse binding until its registered lifetime expires. In a third embodiment of the invention and in parallel with one of the first and the second embodiments the HA also limits the number of bindings maintained, no matter how long their timeout is, to say two so that when the MN creates a third binding, the first one is automatically removed. In another embodiment, the MN or FA can include a lifetime value to be used at the HA to indicate the length of time that the old binding is kept after the new binding is installed, and hence overwrites the fixed timeout value.

Explicit simultaneous reverse bindings are used in various embodiments. In make before break environments it is possible for a MN to maintain multiple link layer connections to the network via multiple access routers. In this case, the MN is able to manage MIP state in the HA for two (or more) independent CoAs. In effect, a MN should be able to register multiple reverse tunnels as required without necessarily affecting the forward tunnel(s). Note that current MIP specifications do not support such behavior. The invention described in this section enables mobile nodes to explicitly request reverse only tunnels in the HA without affecting or moving the forward tunnel(s). As a result, a mobile node can now have one or more (N) forward binding(s) and one or more (M) reverse tunnels (M≧N) that automatically include the CoA of any forward binding. A given MN can then remain indefinitely in this kind of situation as required by its link layer environment.

In an exemplary Mobile IPv4 (MIPv4) based implementation of this invention the following steps are taken. One way to implement the required behavior is the use of flags in the RREQ header that define direction of the binding.

The 'S' Flag

One flag ('S') already exists to indicate a request to install simultaneous bindings. When the 'S' flag is not set, each new binding overwrites the previous binding.

The 'T' Flag

Another flag ('T') also exists to indicate a request for reverse tunneling. When this flag is not set, the binding is only used for forward tunneling, but when the flag is set, it indicates a request for both forward and reverse tunneling.

The 'E' Flag

In this invention we define a new flag 'E' to indicate a request for a reverse only binding to be installed (explicit simultaneous reverse). This bit clearly cannot be set if the existing simultaneous forward and reverse bit is set but all three flags are included below for completeness.

The possible combinations are the following:

| E/T/S | |
|---|---|
| 0/0/0 | Forward only binding |
| 0/0/1 | Simultaneous Forward only binding |
| 0/1/0 | Reverse and Forward binding |
| 0/1/1 | Simultaneous Reverse and Forward binding |
| 1/0/0 | Not valid |
| 1/0/1 | Not valid |
| 1/1/0 | Reverse only Binding (new) |
| 1/1/1 | Not valid |

Note that apart from the 'E' flag defined here and its interaction with the 'T' and 'S' flags, all other aspects of the RREQ remain the same and thus the mobile node and its HA will have to, for example, manage lifetimes for reverse as well as forward tunnels for each independent binding.

In an exemplary Mobile IPv6 (MIPv6) based implementation of this invention the following steps are taken. One way to implement the same behavior in MIPv6 is the use of flags in the BUv6 header that define direction of the binding.

Note that there is not a 'T' Flag in BUv6 because all BUs create bi-directional bindings as mentioned before.

The 'S' Flag

One flag ('S') already exists to indicate a request to install simultaneous bindings. When the 'S' flag is not set, each new binding overwrites the previous binding.

The 'E' Flag

In this invention we define a new flag 'E', as in the MIPv4 solution, to indicate a request for a reverse only binding to be installed (explicit simultaneous reverse). This bit clearly cannot be set if the existing simultaneous forward bit is set.

The possible combinations are the following:

| E/S | |
|---|---|
| 0/0 | Forward and Reverse binding |
| 0/1 | Simultaneous Forward and Reverse binding |
| 1/0 | Reverse only binding (new) |
| 1/1 | Not valid |

Note that, as with MIPv4, apart from the 'E' flag defined here and its interaction with the 'S' flags, all other aspects of the BUv6 remain the same and thus the mobile node and its HA will have to, for example, manage lifetimes for reverse as well as forward tunnels for each independent binding.

In an exemplary split tunneling based implementation of this invention the following steps are taken. Another way of getting similar results is to implement this functionality as an extension to the split tunneling concept defined for MIPv6 and for MIPv4.

Split Tunneling allows a MN to create multiple simultaneous bindings in the HA and assign traffic filters (classifiers) to each binding such that only certain type of traffic (e.g.: voice vs. data) is tunneled using any one binding. For the purposes of this invention a NULL filter could be defined instead or in addition of using the 'E' flag described above. A NULL filter would have the effect that no traffic would match the filter at the HA side and thus the binding will only be used for reverse tunneled traffic from the MN. The mechanism would in other respects be similar or identical to that described based on flags.

An alternative embodiment of this invention also uses the old FA for the same purpose as described below.

This is achieved by the MN sending a standard MIP Reg via the oldFA to refresh the existing binding at the HA for both forward and reverse tunneling. However, included in this message is a new extension, the Alternative Reverse CoA, that explicitly identifies the additional CoA(s) from which reverse tunneling should be accepted in the oFA and/or the HA. The extension also identifies via 2 flags if tunneling to oFA, HA or both is requested. The MIP Reply for this Reg is sent to the source of the MIP Reg and so the newFA that owns the explicitly defined reverse only CoA does not see any signaling.

To enable this new FA to undertake this tunneling for the MN, it would be necessary for an inter FA message to be sent to the new FA, from the old FA seeing the successful explicit reverse extension, to transfer the required MIP visitor list information, analogous to a forward-hand-off but only for the purposes of creating reverse only binding state in the new FA. Alternatively, the explicit reverse only extension, when accepted at a supporting HA, could trigger the HA to send an additional MIP Reply to the new FA, causing the newFA to transfer context state from the initiating FA to enable the visitor list state to be safely built. Alternatively, the visitor list state could be installed or triggered by the MN sending an MIP Reg itself just to the FA, which is then matched to either the additional MIP Reply from the HA, or the transferred context state from the initiating FA. Alternatively, and finally, the reverse only tunneling would be limited to a MN CCoA obtained at the newFA to enable packets to be tunneled either to the oFA or direct to the HA. The newFA can safely allow such packets to pass because they will only be accepted in the oFA and/or HA if reverse tunneling state is in place for that MN CCoA.

The alternate reverse only CoA extension should be skippable with an MIP reply code or extension required to indicate if the Reg extension was processed and successful or unsuccessful. This is necessary so that backwards compatibility is supported with previous versions of FA and HA software as follows. If the HA does not support the explicit extension then the extension is skipped as required and the MIP Reg indicates that this is so. If the FA did however support the extension then the MIP Reply to the MN should inform that MN that reverse tunneling is acceptable from the new CoA to the oFA but not direct to the HA. If the FA also did not process the extension successfully then the MIP Reg simply refreshes the existing forward and reverse binding in the HA.

If the HA does support the extension then the MIP Reply informs the old FA and the MN that this is the case and reverse tunneling to the HA direct from the new CoA is installed but without moving the downlink to the new CoA. If the old FA also supports the extension then the old FA can support the installation of the required state in the newFA depending on the signaling model. If the FA does not support the extension then this may prevent reverse tunneling direct to the HA from the newCoA and will prevent reverse tunneling from the newCoA via the oldFA.

In summary, the MN expects to see two pieces of information in the MIP Reply that indicates both HA success and oldFA success. If either is missing then the MN still knows the state of its bindings and can then still use reverse tunneling to either the HA or to the oFA depending on the missing information.

The relationship of the explicit mechanism to the implicit mechanism is that when one of the 'explicit' reverse only bindings for a FA CoA is updated with a forward and reverse MIP Registration via that FA, or when such a binding is sent via an additional third new CoA, then the downlink is moved as normal to that FA CoA and 'implicit' simultaneous reverse tunneling is left in place with the old CoA that was the previous downlink, and with any other remaining explicit reverse only bindings from additional CoAs. Note also that the alternative reverse CoA can now be used in the MIP Reg from the new FA (that was used to install implied reverse only bindings for all remaining bindings) to explicitly identify which of the remaining bindings will be left active as reverse only bindings. All signaling options are modified to reflect the fact that it is the new FA and not the old FA that will see the MIP Reg/Reply information.

The relationship of implicit reverse only tunneling to simultaneous downlink bindings is that implicit reverse only is created in the HA, for all previous forward and reverse bindings, when the first MIP Reg is received at the HA that does not have the simultaneous downlink binding flag set.

MIP signaling supports two types of extensions, skippable and non-skippable. A node that does not understand a skippable extension can ignore it and process the message as normal. A node that does not understand a non-skippable extension silently discards the message. A reverse binding lifetime extension in an implied request for simultaneous reverse must be skippable to be backwards compatible so that an FA that does not support it will still forward it to the HA, and a HA that does not support it will still move the downlink correctly.

In the case of an explicit request for simultaneous reverse only binding, the new flag would not be read in a legacy HA (acts like a skippable extension) and the downlink would be moved prematurely with bad consequences. Split tunneling solution would generate similar behavior, although the sender in this case is expecting an explicit positive/negative response to the sub-options used in these mechanisms. If the sub-options are not recognized, the sender will have some indication that something went wrong and can potentially register again to return the binding to its previous state while it can also remember that the HA does not support the mechanism in question.

A non-skippable extension should therefore be used for an explicit request so that explicit reverse tunnel bindings will only succeed if all the elements involved support the associated behavior.

The explicit request can also be supported in MIPv4 by having the MN issue a RREQ with an appropriate extension requesting explicit reverse tunneling. The RREQ will be formatted as a normal RREQ for the current CoA, while the extension will be requesting a reverse tunnel from another CoA (from a new or alternative FA)

If the FA or HA does not support the explicit extension then the downlink is not incorrectly moved since the HA will ignore the extension and the RREQ will appear as a refresh to the existing binding. The HA in MIPv4 sends the Registration Reply to the FA that was the source of the request. Note that the newFA is not involved in the exchange. So the additional feature required is that FAs for authenticated MNs be prepared to accept reverse tunneled packets from MNs addressed to an arbitrary HA, safe in the knowledge that that HA will only accept them if a binding is in place.

To enable the FA to undertake this tunneling for the MN in a secure manner, it would be necessary for a message to be sent to the newFA from the FA seeing the successful explicit reverse extension. This message will transfer the required binding information and any required security information, as done today with Context transfer during standard forward handoffs. Alternatively, the explicit reverse only extension, when accepted at a supporting HA, could trigger the HA to send MIP Replies to both the sender and the newFA, causing the newFA to request Context Transfer state from the initiating FA. Alternatively, the visitor list state could be installed or triggered by the MN sending an RREQ itself just to the FA, then matched to either the additional Registration Reply from the HA, or the Context transferred state from the initiating FA.

The present application hereby expressly incorporates the U.S. Provisional Patent Applications listed in the Related Applications section of this patent application. However, it is to be understood that any mandatory language such as, e.g., must, is required, and necessary, found in any of the provisional applications is to be interpreted as applying to the examples and embodiments described in the particular provisional application and in no way limits the scope of the claims or invention described in the text of this application which is not incorporated by reference.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s). The methods and apparatus of the present invention are applicable to a wide range of communications systems including many OFDM, CDMA and other non-OFDM systems.

The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Numerous additional variations on the methods and apparatus of the present invention described above will be apparent to those skilled in the art in view of the above description of the invention. Such variations are to be considered within the scope of the invention.

What is claimed is:

1. A communications method, for use with a first mobile node, the method comprising:

operating a mobility management node to receive mobility management signals relating to said first mobile node;

storing, in response to the received mobility management signals, tunnel information defining first and second incoming tunnels and an outgoing tunnel, said tunnels being associated with said first mobile node, said incoming and outgoing being relative to said mobility agent node;

said stored tunnel information including an IP address of said first mobile node which is associated with said first and second incoming tunnels and said outgoing tunnel;

said stored tunnel information, defining said first incoming tunnel and said outgoing tunnel, including first and second tunnel end node addresses corresponding to first and second tunnel end nodes, respectively, the end nodes of said first incoming tunnel and said outgoing tunnel being the same, the first tunnel end node address being an address corresponding to said mobility management node, the second tunnel end node address being a destination address of the outgoing tunnel and a source address of said first incoming tunnel; and said stored tunnel information, defining said second incoming tunnel, including third and fourth tunnel end node addresses corresponding to third and fourth tunnel end nodes, respectively, the third tunnel end node address being the destination address of the second incoming tunnel and corresponding to said nobility management node, said fourth tunnel end node address being different from said first, second and third tunnel end node addresses and being the source address of the second incoming tunnel.

2. The method of claim 1, further comprising:

operating the mobility management node to receive another mobility management signal; and in response to said another mobility management signal, updating the stored tunnel information to change the destination address of the outgoing tunnel from said second tunnel end node address to another tunnel end node address.

3. The method of claim 2, wherein updating the stored tunnel information to change the destination address of the outgoing tunnel does not affect the stored first incoming tunnel address information.

4. The method of claim 3, wherein said another tunnel end node address is said fourth tunnel end node address.

5. The method of claim 2, further comprising:

removing said first incoming tunnel, said step of removing the first incoming tunnel including deleting at least some of the address information corresponding to the first incoming tunnel.

6. The method of claim 5 wherein said deletion is in response to yet another mobility management signal received by said mobility management node.

7. The method of claim 5, wherein said deletion is performed without affecting the information corresponding to said outgoing tunnel.

8. The method of claim 2, further comprising:

in response to receiving an additional mobility management signal, deleting from the stored tunnel information the information defining said second incoming tunnel without altering information defining said first incoming tunnel and said outgoing tunnel.

9. The method of claim 2, further comprising:

storing independent tunnel life time information for each of the first and second incoming tunnels and said outgoing tunnel.

10. The method of claim 1, wherein the source addresses of the first and second incoming tunnels correspond to different access nodes.

11. The method of claim 1, wherein the source addresses of the first and second incoming tunnels are different IP addresses corresponding to said mobile node.

12. The method of claim 1, further comprising:
operating said mobility management node to perform mobility management tunnel operations corresponding to a plurality of mobile nodes, said mobility management operations including storing information used to maintain multiple incoming tunnels and at least one outgoing tunnel for each of a plurality of mobile nodes at the same time, the incoming tunnels corresponding to individual ones of said mobile nodes having different tunnel source node addresses.

13. The method of claim 1, wherein said stored tunnel information defining said first incoming tunnel and said outgoing tunnel include a tunnel type indicator flag associated with said first and second tunnel end node addresses, said indicator flag indicating that said first and second tunnel end node addresses correspond to a bi-directional tunnel, said outgoing tunnel and said first incoming tunnel being included in said bi-directional tunnel.

14. The method cit claim 13, further comprising:
operating the mobility management node to receive another mobility management signal; and
in response to said another mobility management signal, updating the stored tunnel information to remove said outgoing tunnel by changing said bi-direction tunnel flag to an incoming tunnel flag.

15. The method of claim 14, further comprising:
establishing a new outgoing tunnel between said mobility management node and the tunnel end node which serves as the source tunnel end node of said second incoming tunnel.

16. The method of claim 15, wherein establishing said new outgoing tunnel includes changing a tunnel type identifier flag associated with said second incoming tunnel to indicate that said second incoming tunnel is a bidirectional tunnel.

17. A communications system, for use with a first mobile node, the system comprising:
a mobility management node including:
means for receiving mobility management signals relating to said first mobile node;
means for storing, in response to the received mobility management signals, tunnel information defining first and second incoming tunnels and an outgoing tunnel, said tunnels being associated with said first mobile node, said incoming and outgoing being relative to said mobility management node;
said stored tunnel information including an IP address of said first mobile node which is associated with said first and second incoming tunnels and said outgoing tunnel;
said stored tunnel information, defining said first incoming tunnel and said outgoing tunnel, including first and second tunnel end node addresses corresponding to first and second tunnel end nodes, respectively, the end nodes of said first incoming tunnel and said outgoing tunnel being the same, the first tunnel end node address being an address corresponding to said mobility management node, the second tunnel end node address being a destination address of the outgoing tunnel and a source address of said first incoming tunnel; and
said stored tunnel information further defining said second incoming tunnel, including third and fourth tunnel end node addresses corresponding to third and fourth tunnel end nodes, respectively, the third tunnel end node address being the destination address of the second incoming tunnel and corresponding to said mobility management node, said fourth tunnel end node address being different from said first, second and third tunnel end node addresses and being the source address of the second incoming tunnel.

18. The system of claim 17, wherein said mobility management node further includes:
means for updating the stored tunnel information to change the destination address of the outgoing tunnel from said second tunnel end node address to another tunnel end node address, in response to another mobility management signal.

19. The system of claim 18, wherein updating the stored tunnel information to change the destination address of the outgoing tunnel does not affect the stored first incoming tunnel address information.

20. The system of claim 19, wherein said another tunnel end node address is said fourth tunnel end node address.

21. A mobile communications method for use with a mobile node having a mobile node IP address, comprising:
receiving mobility management signals at a mobility agent node;
in response to said received signals independently establishing first and second incoming tunnels and at most one outgoing tunnel, said first and second incoming tunnels and said at most one outgoing tunnel corresponding to said mobile node and being associated with said mobile node IP address, said incoming and outgoing being relative to said mobility agent node;
said first and second incoming tunnels having a mobility agent node address as a destination tunnel end node address and said at most one outgoing tunnel having said mobility agent node address as a source tunnel end node address; and
said first and second incoming tunnels having different source tunnel end node addresses.

22. The mobile communications method of claim 21, wherein the source tunnel end node address of one of said first and second incoming tunnels is the same as the destination tunnel end node address of said at most one outgoing tunnel.

23. The method of claim 22,
wherein said first incoming tunnel and said at most one outgoing tunnel exist between said mobility agent node and a first network node; and
wherein said second incoming tunnel exists between said mobility agent node and a second network node, said second network node being different from said first network node.

24. The mobile communications method of claim 23, further comprising:
moving the at most one outgoing tunnel without moving said incoming tunnel.

25. The mobile communications method of claim 24, where moving the at most one outgoing tunnel includes;
changing the destination address of said at most one outgoing tunnel by modifying stored tunnel destination address information.

26. The mobile communications method of claim 23, further comprising:
removing one of the established incoming tunnels in response to receiving another mobility management signal.

27. A mobile communications method for use with a mobile node having a mobile node IP address, comprising:
receiving mobility management signals at a mobility agent node;
in response to said received signals independently establishing first and second incoming tunnels and at most one outgoing tunnel, said first and second incoming tunnels and said at most one outgoing tunnel corresponding to said mobile node and being associated with said mobile node IP address, said incoming and outgoing being relative to said mobility agent node;
said first and second incoming tunnels having a mobility agent node address as a destination tunnel end node address and said at most one outgoing tunnel having said mobility agent node address as a source tunnel end node address;
said first and second incoming tunnels having different source tunnel end node addresses;
wherein the source tunnel end node address of one of said first and second incoming tunnels is the same as the destination tunnel end node address of said at most one outgoing tunnel;
wherein said first incoming tunnel and said at most one outgoing tunnel exist between said mobility agent node and a first network node;
wherein said second incoming tunnel exists between said mobility agent node and a second network node, said second network node being different from said first network node;
removing one of the established incoming tunnels in response to receiving another mobility management signal; and
wherein the removed incoming tunnel is the first incoming tunnel, the method further comprising:
generating, prior to said removing step, said another mobility management signal in response to a first handoff operation involving a handoff of said mobile node from said first network node to said second network node.

28. The method of claim 27, further comprising:
receiving an additional mobility management signal as part of a handoff of said mobile node from said second network node to a third network node; and
in response to receiving said additional mobility management signal adding an additional incoming tunnel corresponding to said mobile node, said additional incoming tunnel being between said third network node and said mobility agent node.

29. The method of claim 28, further comprising:
prior to establishing said additional incoming tunnel, establishing a forwarding tunnel between said third network node and said second network node.

30. The method of claim 29, further comprising:
operating the third network node to receive IP packets from said mobile node; and
operating the third network node to forward the received IP packets to said second network node through said forwarding tunnel.

31. The method of claim 30, further comprising:
operating the second network node to transmit IP packets received from said forwarding tunnel to said mobility agent node through said second incoming tunnel.

32. The method of claim 31, further comprising:
terminating said forwarding tunnel following establishment of said additional incoming tunnel; and
using said additional incoming tunnel to transmit packets received by said third network node from said mobile node to said mobility agent node.

33. The method of claim 32, further comprising:
moving said at most one outgoing tunnel so that said at most one outgoing tunnel is between said mobility agent node and said third node; and
terminating said second incoming tunnel.

34. A communications method, for use with a first mobile node and a mobility management node, the method comprising:
operating the mobility management node to encapsulate and forward inner packets that arrive at the mobility management node with a destination address equal to the home address of the first mobile node, into a first tunnel that at least supports outgoing tunneling;
operating the mobility management node to additionally decapsulate and forward inner packets, that have a source address equal to the home address of the first mobile node, and that arrive at the mobility management node in a second incoming only tunnel;
said incoming and outgoing being relative to said mobility management node;
said first and second tunnels being described by stored tunnel information in the mobility management node;
said stored tunnel information including the home address of said first mobile node which is associated with said second incoming only tunnel and said first tunnel;
said stored tunnel information, defining said first tunnel including first and second tunnel end node addresses corresponding to first and second tunnel end nodes, respectively, the first tunnel end node address being an address corresponding to said mobility management node, the second tunnel end node address being at least the destination address of the first tunnel for outgoing packets; and
said stored tunnel information defining said second incoming only tunnel, including third and fourth tunnel end node addresses corresponding to third and fourth tunnel end nodes, respectively, the third tunnel end node address being only the destination address of the second incoming tunnel and corresponding to said mobility management node, said fourth tunnel end node address being different from said first, second and third tunnel end node addresses, and being the source address of the second incoming only tunnel.

35. The method of claim 34 further comprising:
a first portion of said first tunnel information supporting communication of outgoing tunneled packets from the mobility management node directed to the home address of the first mobile node;
a second portion of said first tunnel information supporting communication of incoming tunneled packets to the mobility management node via a second tunnel end node having said second tunnel end node address, said incoming tunneled packets having a source address which is the home address of the mobile node;
a third portion of said first tunnel information supporting communication of incoming tunneled packets to the mobility management node via a fourth tunnel end node having said fourth tunnel end node address, said incoming tunneled packets having a source address which is the home address of the mobile node;
said first and second portions being selectively enabled at a given point in time to create one of an outgoing only tunnel, an incoming only tunnel, and a bi-directional tunnel.

36. The method of claim 34, wherein the second and fourth tunnel end node addresses correspond to different access nodes or to different IP addresses corresponding to said mobile node.

37. The method of claim 34, further comprising:
operating said mobility management node to perform mobility management tunnel operations corresponding to a plurality of mobile nodes, said mobility management operations including storing information used to maintain multiple incoming tunnels and at least one outgoing tunnel for each of a plurality of mobile nodes at the same time, the incoming tunnels corresponding to individual ones of said mobile nodes having different tunnel source node addresses.

38. The method of claim 35, further comprising: selectively enabling the third portion of said first tunnel information to create an incoming only tunnel when at least said first portion of said first tunnel information has been enabled.

39. The method of claim 38, further comprising:
in response to receiving an additional mobility management signal, deleting from the stored tunnel information the information defining said second incoming tunnel without altering information defining said first incoming tunnel and said outgoing tunnel.

40. The method of claim 35 further comprising
a fourth portion of said first tunnel information, said forth portion supporting communication of outgoing tunneled packets from the mobility management node via a fourth tunnel end node having said fourth tunnel end node address, said outgoing tunneled packet having a destination address equal to the home address of the first mobile node, said third and fourth portions being selectively enabled at a point in time to create one of an outgoing only tunnel, an incoming only tunnel, and a bidirectional tunnel.

41. The method of claim 40, further comprising:
operating the mobility management node to receive mobility management signals relating to said first mobile node;
said mobility management signals defining the status of the first or second tunnel as to whether it is now outgoing only, incoming only, bi-directional or cancelled;
updating in response to the said received mobility management signals, the outgoing and incoming information of the first or second tunnel; and
modifying the tunnel information associated with the second or first tunnel respectively as a result of the signaled changes to the first or second tunnel.

42. The method of claim 41, further comprising:
the first tunnel supporting the bi-directional tunnel capability;
operating the mobility management node to receive another mobility management signal; and
in response to said another mobility management signal, updating the stored tunnel information to activate the outgoing tunnel capability of the second tunnel and cancel the outgoing tunnel capability of the first tunnel.

43. The method of claim 41 further comprising;
operating the mobility management node to receive another mobility management signal;
said signal defining a third incoming only tunnel which is added to the tunnel information in the mobility management node; and
said signal not affecting the tunnel information for the first tunnel but deleting the information for the second incoming only tunnel.

44. The method of claim 35, further comprising;
storing independent tunnel life time information for each of the first and second incoming tunnels and said outgoing tunnel.

45. A mobility management node including a processor configured to implement a communications method, the communications method comprising:
receiving mobility management signals relating to a first mobile node;
storing, in response to the received mobility management signals, tunnel information defining first and second incoming tunnels and an outgoing tunnel, said tunnels being associated with said first mobile node, said incoming and outgoing being relative to said mobility agent node;
said stored tunnel information including an IP address of said first mobile node which is associated with said first and second incoming tunnels and said outgoing tunnel;
said stored tunnel information, defining said first incoming tunnel and said outgoing tunnel, including first and second tunnel end node addresses corresponding to first and second tunnel end nodes, respectively, the end nodes of said first incoming tunnel and said outgoing tunnel being the same, the first tunnel end node address being an address corresponding to said mobility management node, the second tunnel end node address being a destination address of the outgoing tunnel and a source address of said first incoming tunnel; and
said stored tunnel information, defining said second incoming tunnel, including third and fourth tunnel end node addresses corresponding to third and fourth tunnel end nodes, respectively, the third tunnel end node address being the destination address of the second incoming tunnel and corresponding to said mobility management node, said fourth tunnel end node address being different from said first, second and third tunnel end node addresses and being the source address of the second incoming tunnel.

46. The mobility management node of claim 45, wherein said processor is further configured to:
receive another mobility management signal; and
in response to said another mobility management signal, update the stored tunnel information to change the destination address of the outgoing tunnel from said second tunnel end node address to another tunnel end node address.

47. The mobility management node of claim 46, wherein updating the stored tunnel information to change the destination address of the outgoing tunnel does not affect the stored first incoming tunnel address information.

48. The mobility management node of claim 46, wherein said another tunnel end node address is said fourth tunnel end node address.

49. A computer readable medium including machine executable instructions for controlling a mobility management node to implement a communications method, the communications method comprising:
receiving mobility management signals relating to a first mobile node;
storing, in response to the received mobility management signals, tunnel information defining first and second incoming tunnels and an outgoing tunnel, said tunnels being associated with said first mobile node, said incoming and outgoing being relative to said mobility agent node;

said stored tunnel information including an IP address of said first mobile node which is associated with said first and second incoming tunnels and said outgoing tunnel;

said stored tunnel information, defining said first incoming tunnel and said outgoing tunnel, including first and second tunnel end node addresses corresponding to first and second tunnel end nodes, respectively, the end nodes of said first incoming tunnel and said outgoing tunnel being the same, the first tunnel end node address being an address corresponding to said mobility management node, the second tunnel end node address being a destination address of the outgoing tunnel and a source address of said first incoming tunnel; and said stored tunnel information, defining said second incoming tunnel, including third and fourth tunnel end node addresses corresponding to third and fourth tunnel end nodes, respectively, the third tunnel end node address being the destination address of the second incoming tunnel and corresponding to said mobility management node, said fourth tunnel end node address being different from said first, second and third tunnel end node addresses and being the source address of the second incoming tunnel.

50. The computer readable medium of claim 49, wherein the computer readable medium further includes instruction for controlling the mobility management node to:

receive another mobility management signal; and in response to said another mobility management signal, updating the stored tunnel information to change the destination address of the outgoing tunnel from said second tunnel end node address to another tunnel end node address.

51. The computer readable medium of claim 50, wherein updating the stored tunnel information to change the destination address of the outgoing tunnel does not affect the stored first incoming tunnel address information.

52. The computer readable medium of claim 51, wherein said another tunnel end node address is said fourth tunnel end node address.

53. A mobility management node, for use with a first mobile node, the mobility management node comprising:

a receiver for receiving mobility management signals relating to said first mobile node;

a memory module for storing, in response to the received mobility management signals, tunnel information defining first and second incoming tunnels and an outgoing tunnel, said tunnels being associated with said first mobile node, said incoming and outgoing being relative to said mobility agent node;

said stored tunnel information including an IP address of said first mobile node which is associated with said first and second incoming tunnels and said outgoing tunnel;

said stored tunnel information defining said first incoming tunnel and said outgoing tunnel, including first and second tunnel end node addresses corresponding to first and second tunnel end nodes, respectively, the end nodes of said first incoming tunnel and said outgoing tunnel being the same, the first tunnel end node address being an address corresponding to said mobility management node, the second tunnel end node address being a destination address of the outgoing tunnel and a source address of said first incoming tunnel; and said stored tunnel information further defining said second incoming tunnel, including third and fourth tunnel end node addresses corresponding to third and fourth tunnel end nodes, respectively, the third tunnel end node address being the destination address of the second incoming tunnel and corresponding to said mobility management node, said fourth tunnel end node address being different from said first, second and third tunnel end node addresses and being the source address of the second incoming tunnel.

54. The mobility management node of claim 53, further includes:

an update module for updating the stored tunnel information to change the destination address of the outgoing tunnel from said second tunnel end node address to another tunnel end node address, in response to another mobility management signal.

55. The system of claim 54, wherein updating the stored tunnel information to change the destination address of the outgoing tunnel does not affect the stored first incoming tunnel address information.

* * * * *